US009053566B1

(12) United States Patent
Riggs

(10) Patent No.: US 9,053,566 B1
(45) Date of Patent: Jun. 9, 2015

(54) REAL ESTATE BLUEPRINT AND PANORAMIC VIDEO VISUALIZATION

(71) Applicant: Arthur Technologies LLC, Seattle, WA (US)

(72) Inventor: Brian J. Riggs, Edmonds, WA (US)

(73) Assignee: Arthur Technologies LLC, Seattle, WA (US)

( * ) Notice: Subject to any disclaimer, the term of this patent is extended or adjusted under 35 U.S.C. 154(b) by 199 days.

(21) Appl. No.: 13/850,468

(22) Filed: Mar. 26, 2013

Related U.S. Application Data

(60) Provisional application No. 61/617,561, filed on Mar. 29, 2012.

(51) Int. Cl.
*G09G 5/00* (2006.01)
*G06T 11/00* (2006.01)

(52) U.S. Cl.
CPC .................................... *G06T 11/00* (2013.01)

(58) Field of Classification Search
CPC ......... G03B 37/00; G06T 3/0018; G06T 3/40
USPC .................................. 345/632, 660; 359/725
See application file for complete search history.

(56) References Cited

U.S. PATENT DOCUMENTS

| | | | | |
|---|---|---|---|---|
| 7,299,417 | B1 * | 11/2007 | Barris et al. | 715/719 |
| 2005/0210415 | A1 * | 9/2005 | Bree | 715/848 |
| 2006/0049933 | A1 * | 3/2006 | Kelley et al. | 340/524 |
| 2011/0235923 | A1 * | 9/2011 | Weisenburger et al. | 382/201 |
| 2012/0113138 | A1 * | 5/2012 | Uusitalo et al. | 345/629 |

OTHER PUBLICATIONS

Atkins, R.M., "Fisheye to Rectilinear Conversion," © 2003 Robert M. Atkins, <http://photo.net/learn/fisheye/> [retrieved Mar. 28, 2012], 10 pages.

* cited by examiner

*Primary Examiner* — Maurice L McDowell, Jr.
(74) *Attorney, Agent, or Firm* — Christensen O'Connor Johnson Kindness PLLC

(57) ABSTRACT

The subject matter is suitable for facilitating conversion of standard architectural blueprints/maps and panoramic photos, both being directed to a property, and creating an interactive top down viewable map of the blueprint superimposed over an image comprised of the panoramic photos merged together to form a unified perspective. The subject matter uses the processed blueprints to generate a grid template of capture points for panoramic high definition video, images, and audio. Each capture point captures a ground-up and a ceiling-down capture and some captures in between both facing up and down.

20 Claims, 29 Drawing Sheets

Capture point matrix

Capturing and storing image and metadata image/s is captured (along with audio, and metadata) and stored locally or/and uploaded to remote storage Other Gauges distance to wall, beacons, etc.

items completed/uncompleted

Multiple zoom layers for image layer (top-down perspective)

Superimposed Layers in web layer viewer

REAL ESTATE BLUEPRINT AND PANORAMIC VIDEO VISUALIZATION

CROSS-REFERENCE TO RELATED APPLICATION

The application claims the benefit of Provisional Application No. 61/617,561, filed Mar. 29, 2012, which is incorporated herein by reference.

BACKGROUND

Home buyers, renters, and speculators have to make decisions on which homes (for sale or rent) to view in person and consider because there are many homes listed, and there is not enough time to see them all. Sometimes buyers have to buy or rent "sight unseen," based only on pictures attached to an internet listing. In order to make more informed decisions of which properties to consider, it is desirable that the buyer has more information.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
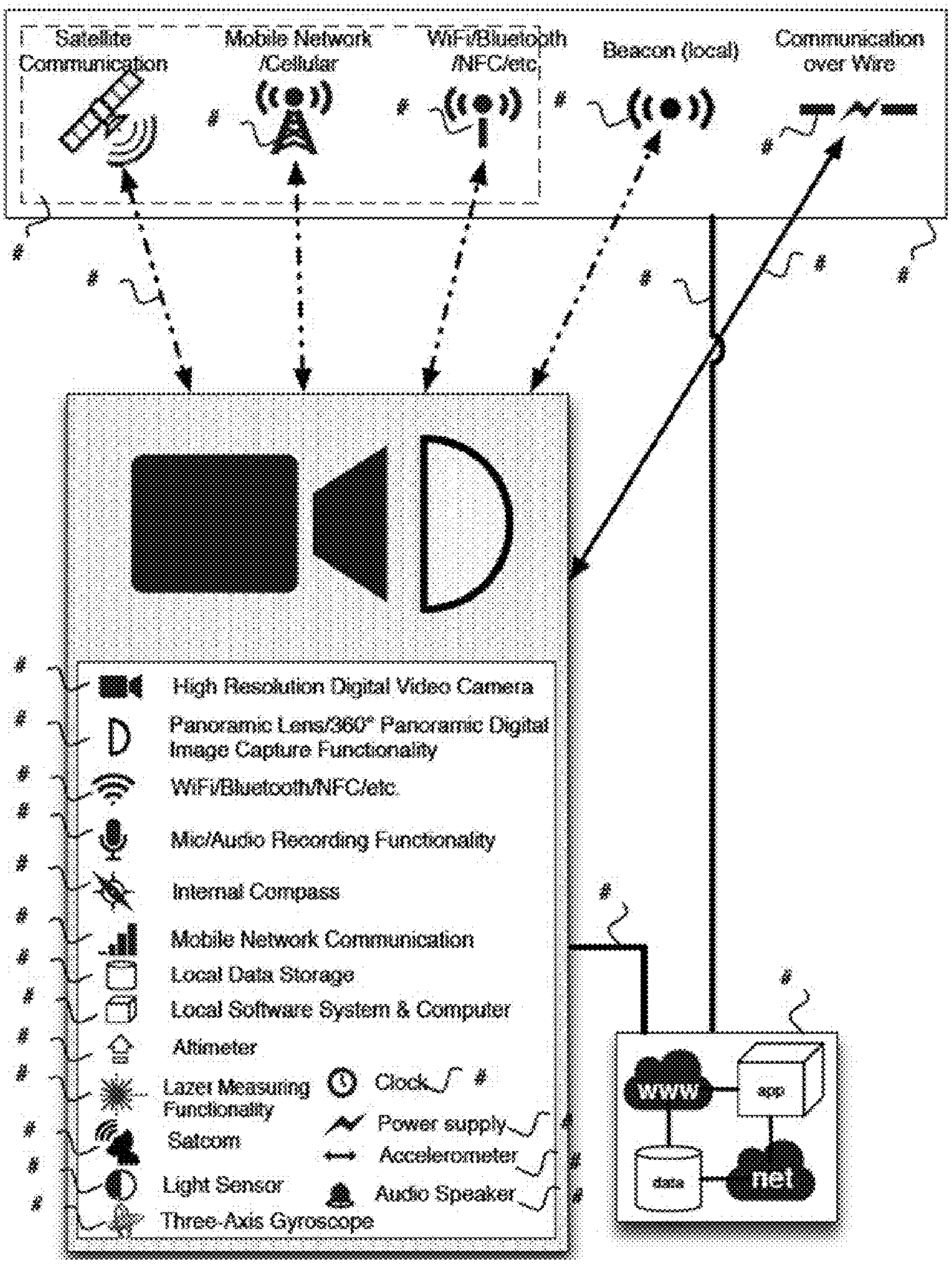
FIGS. 1-29 are pictorial diagrams illustrating archetypical methods and systems.

Various embodiments discuss a process that converts standard architectural blueprints/maps and panoramic photos, both for the same body of real estate, and creates an interactive top down viewable map of the blueprint superimposed over an image comprised of the panoramic photos merged together to form a unified perspective, both blueprint and image in the same scale so as to make the blueprint match the dimensions depicted the spatial features in the merged image.

This system takes a blueprint for a property at a specific address, digitizes it, processes it, and makes it viewable as a standard web-map viewer makes maps viewable on the internet or native operating system application. The system uses an application which takes uploaded digitized images of the blueprints and processes them. The app uses the processed blueprints to generate a grid template of capture points for panoramic high definition video and images, and audio.

These capture points are translated into code or human readable instructions with measurements from X,Y of the grid. A human or an application that controls a camera captures the aforementioned media at each capture point, and the media is stored locally or uploaded and stored on the application server. Each capture point includes a ground-up and a ceiling-down capture and some captures in between both facing up and down. Specifically, half-spheres that use the maximum distance for capturing high definition video as the diameter (less a buffer distance) are overlapped so as to create half-cubes that when arranged side-to-side contain no out of focus/resolution image-data. The capture point grid is created by taking the square area of a room or the property and dividing by the square area figure that is derived from one side of a cube that fits inside (without breach) a sphere that has a radius of the maximum distance of high def capture. (Beyond the distance, the capture would not be high definition.)

The panoramic video, images, and accompanying audio is processed to resemble a unbroken patchwork of ceiling-down images at a certain height from the ground/floor and overlaid or underlaid (to scale) on the blueprint as a layer. This layer is viewable in the same manner as a standard web map, and moves together with the blueprint layer and other layers. There is also a floor-up images layer; the camera was on the floor capturing upwards. This layer is viewable in the same manner as a standard web map, and moves together with the blueprint layer and other layers.

In order to facilitate correct positioning of camera on capture-point, beacons which communicate distance from themselves to the camera can be placed in each corner of the room or property. Beacons are devices that communicate in real time the distance from a communication enabled camera or a device physically attached to a camera. Alternatively, beacons can also be placed on the corners of the property.

The "map"-style viewer of these produced layers contains a play button to play the patchwork of images as if they were a video, and cued up with audio sound captured at the time of the recording. The view has a progress bar which represents a timeline from the start of the capture to the end of the capture. Alternately, the viewer can show just one time of day (a close range of captures).

A layer with a moon icon and/or a sun icon will be placed over the display to indicate the position of the sun and give context to where natural light originated in the state of the image. Center of image would be directly overhead, and a circle surrounding or placed on the image would represent the horizon. The view will display all the layers in any combination of superimposition. For example, given a room is 20' tall, and the maximum distance to capture high def for a camera is 10', at the minimum, two layers would be created for ceiling-down panoramic overlapping images, and two layers would be created for floor-up panoramic overlapping images. When real estate at a specific address is processed through this system, the user will be able to access and interact with the viewer in a web browser.

The following describes archetypical processes.

1. Blueprints of property processed and sent to server
   - 1.1. blueprints or architectural renderings from that property are obtained either in paper or digital image
   - 1.2. paper blueprints are cut if needed to fit into standard desktop scanner
     - 1.2.1. stickers with QR codes are placed on each scan in order to determine origin of scans (who scanned it in) and sequential order
   - 1.3. blueprints are scanned onto computer via scanner
   - 1.4. computer via internet or other methods sends scanned blueprint to remote application
   - 1.5. scanned image files are stored on remote storage
2. remote application processes scanned image files for said property
   - 2.1. a single layer image is formed
     - 2.1.1. remote application merges the images in their correct order and orientation as if they were the original, but now in digital form.
       - 2.1.1.1. remote application automates this process via computer code 2.1.1.1.1. scanned images are sorted by optical recognition computer process 2.1.1.1.2. scanned images are sorted automatically based on order 2.1.1.1.3. scanned images are sorted based on QR code sticker 2.1.1.2. remote application makes an interface available and displays the scanned images and functionality for a user to arrange the images by using the mouse and keyboard 2.2. blueprint cross/side views are separated and associated with other top-down views 2.2.1. remote application automates this process via computer code 2.2.2. remote application makes an interface available and displays the merged scanned blueprint and functionality for a user to enter whether merged scanned image is a cross/side view (true or false) and what top-down view (if any) it is associated with by using the mouse and keyboard 2.3. scale is created and stored 2.3.1. remote application automates this process via computer code 2.3.1.1. remote application uses optical character recognition (OCR) or other similar methods to determine architectural scale of blueprint 2.3.1.2. scale is determined by using property address to search a database of blueprint scales desired by legal jurisdictional building codes 2.3.1.3. scale is determined by using property address to search a custom database 2.3.2. remote application makes a interface available and displays the merged scanned blueprint and functionality for a user to enter scale by using the mouse and keyboard 2.4. vector file is created and stored 2.4.1. both cross/side view and top view blueprints are vectorized and saved 2.4.2. vector is rendered 2.4.2.1. remote application automates this process via computer code 2.4.2.1.1. white areas, or areas representing planes, such as walls, ceilings, floors, etc. are removed, leaving the edge of planes (the lines an architect would draw on paper)

Figure 2:
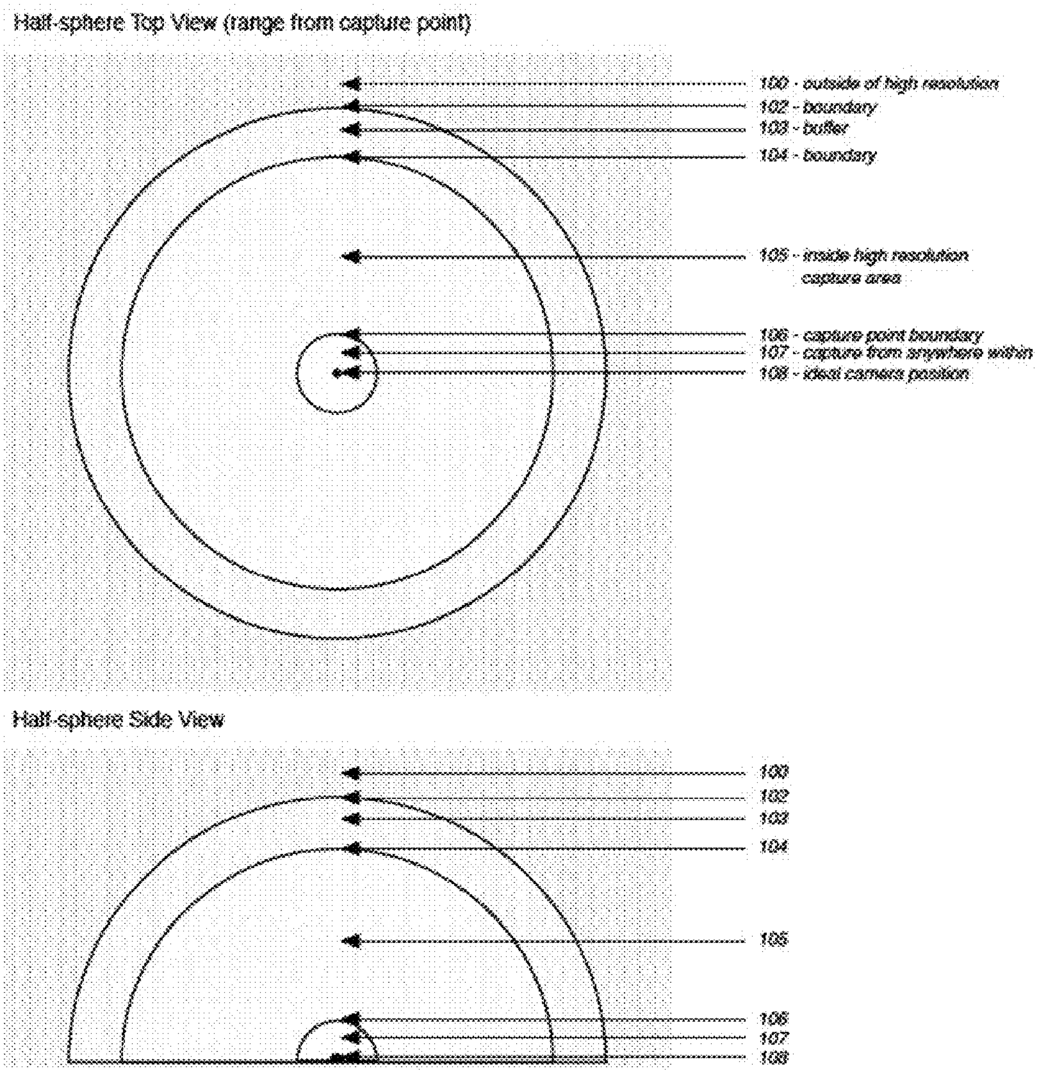
Figure 3:
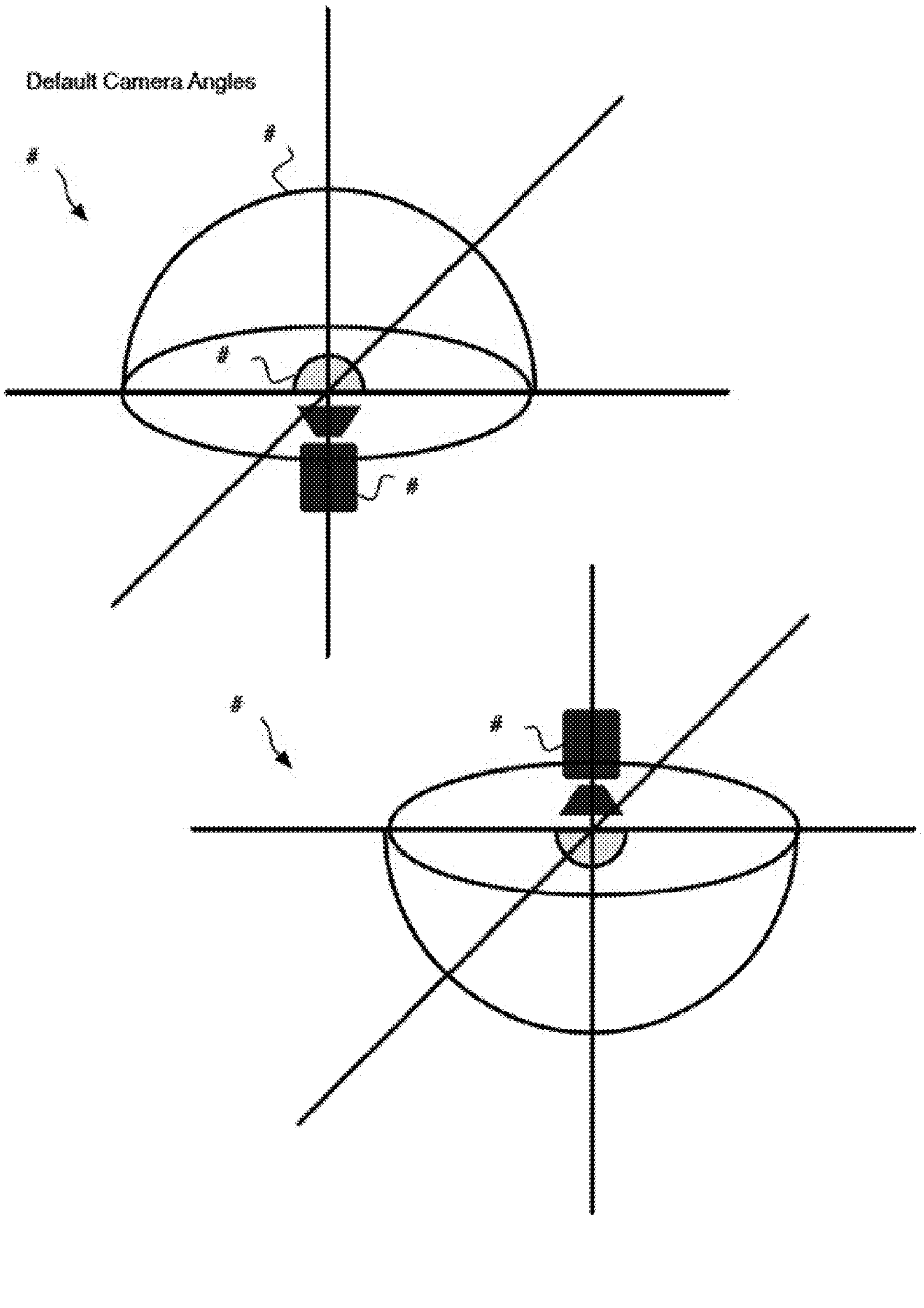
Figure 4:
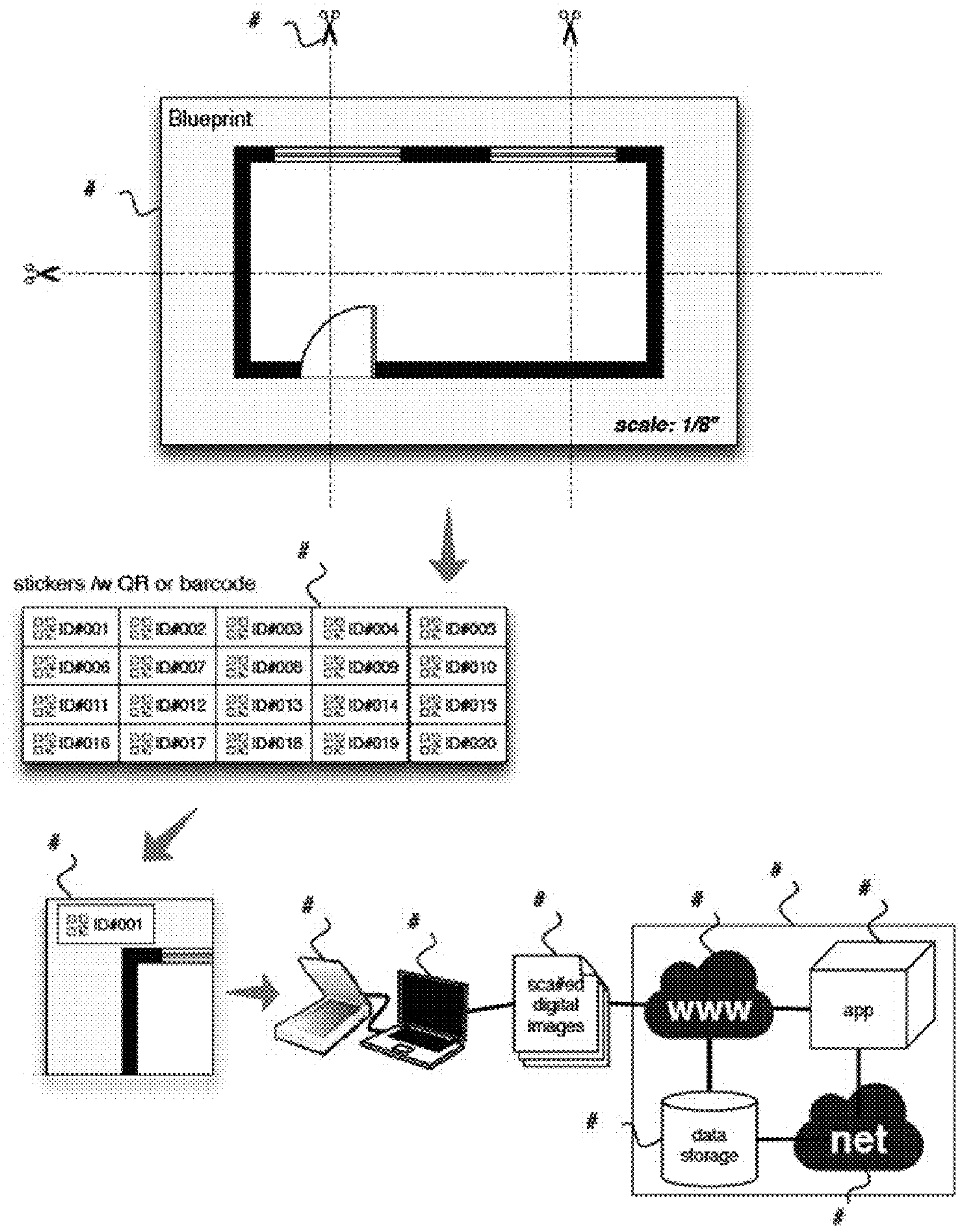
Figure 5:
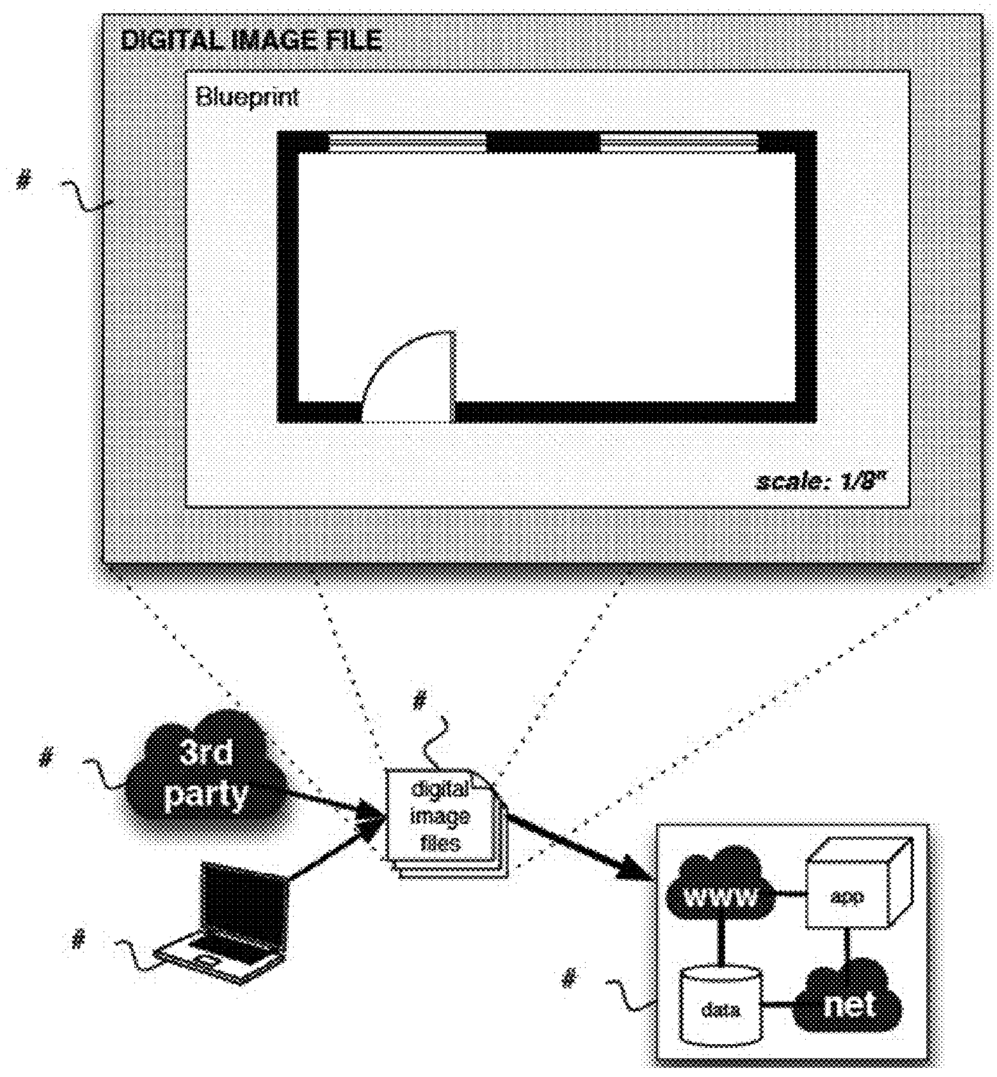
Figure 6:
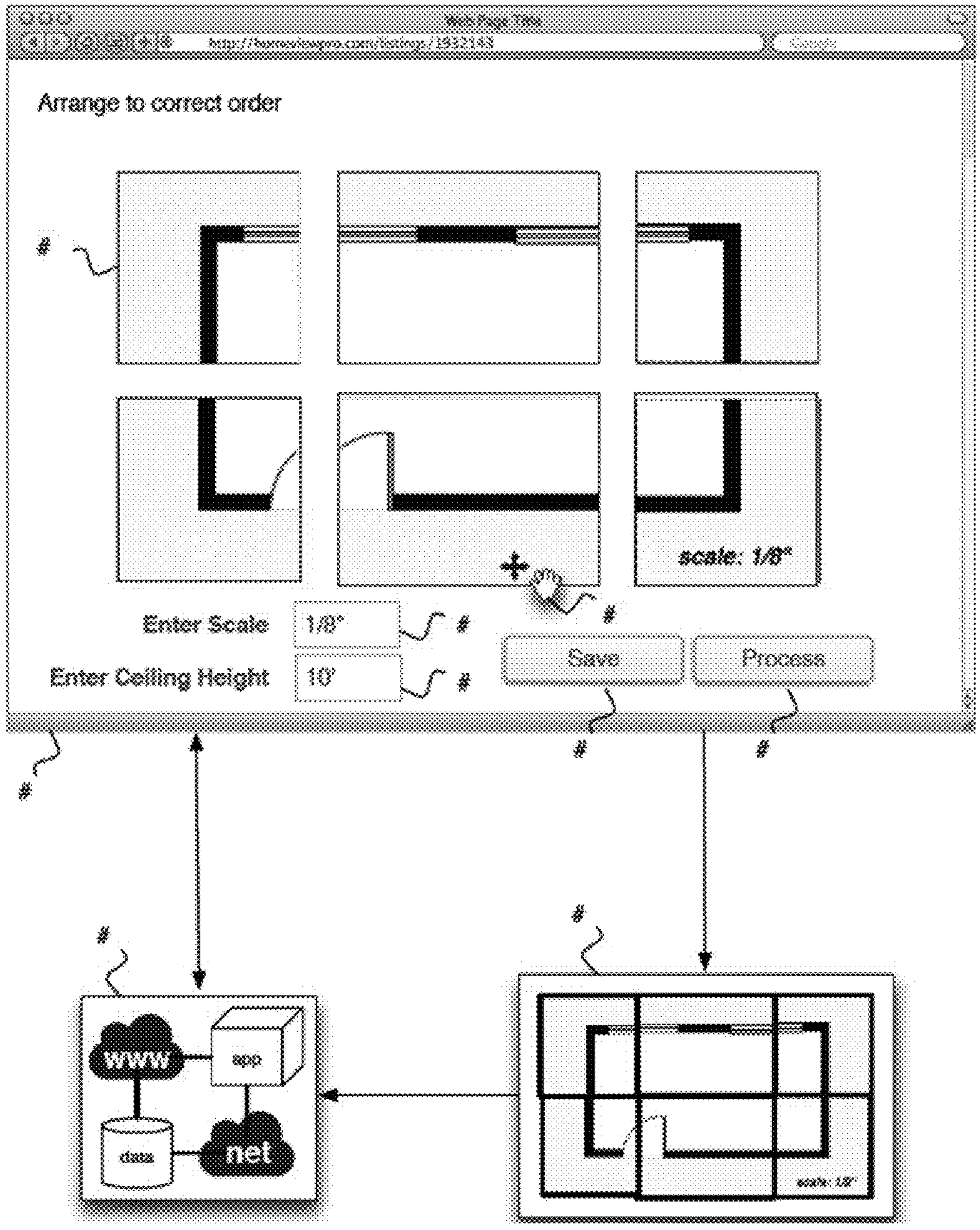
Figure 7:
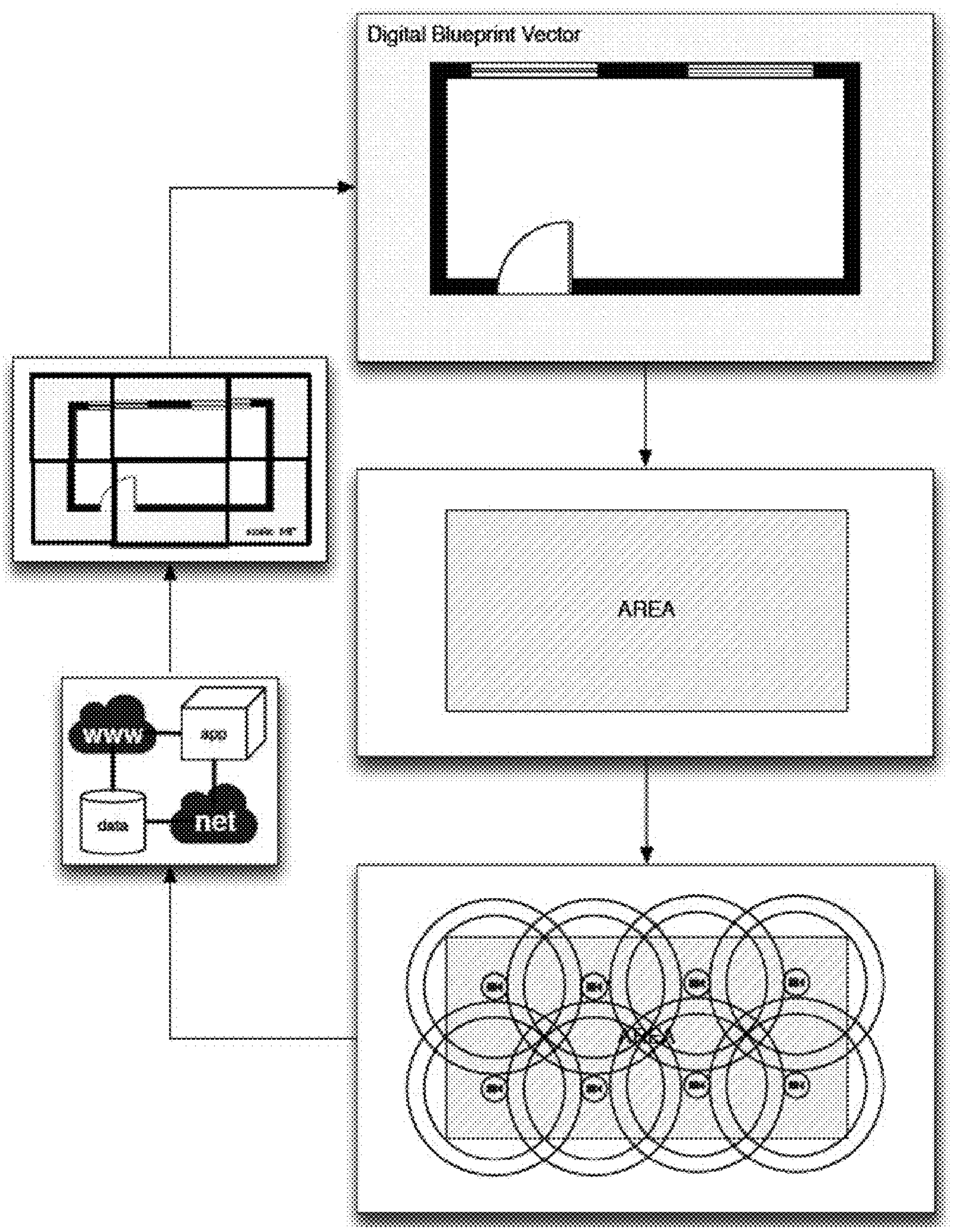
Figure 8:
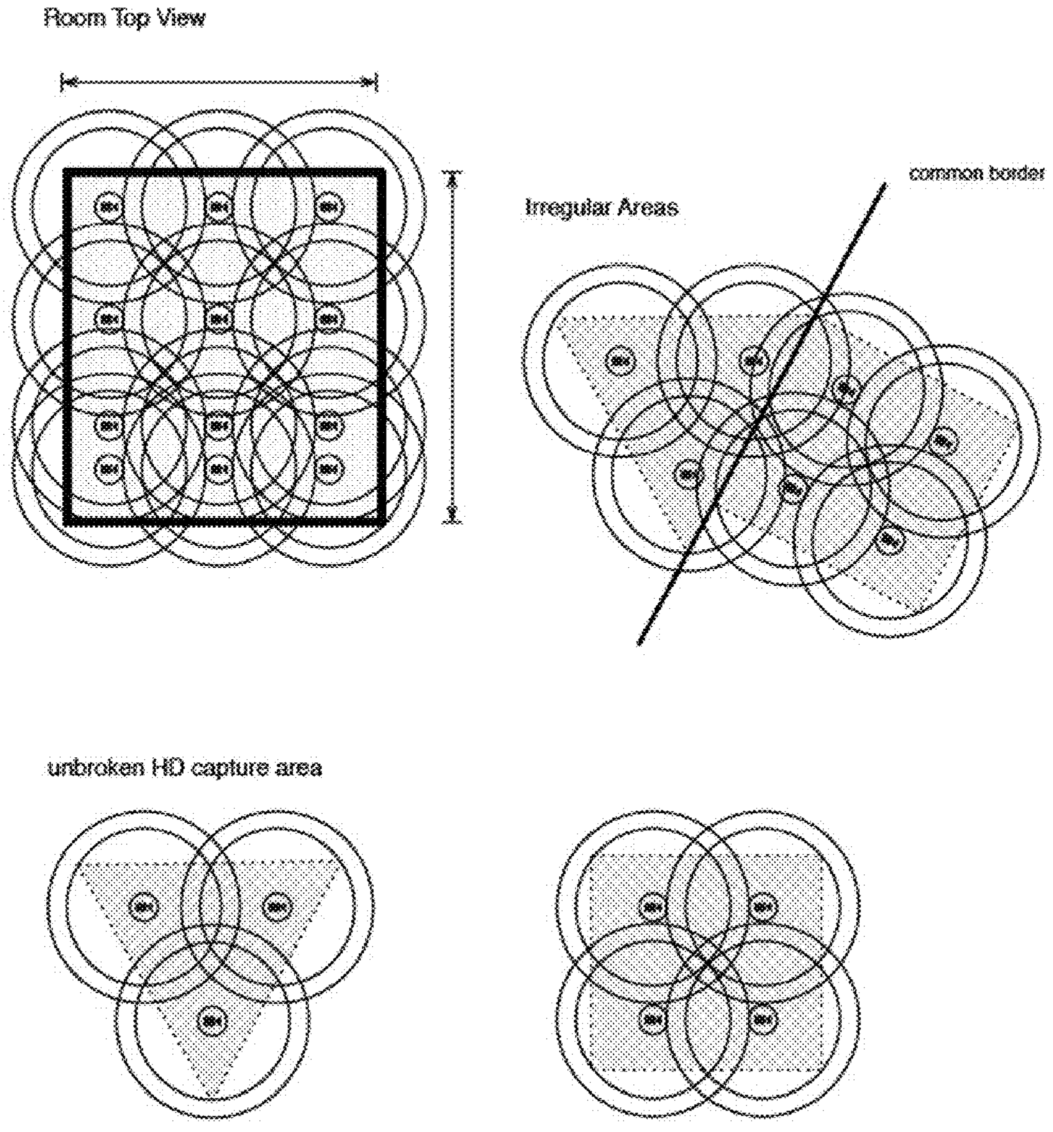
Figure 9:
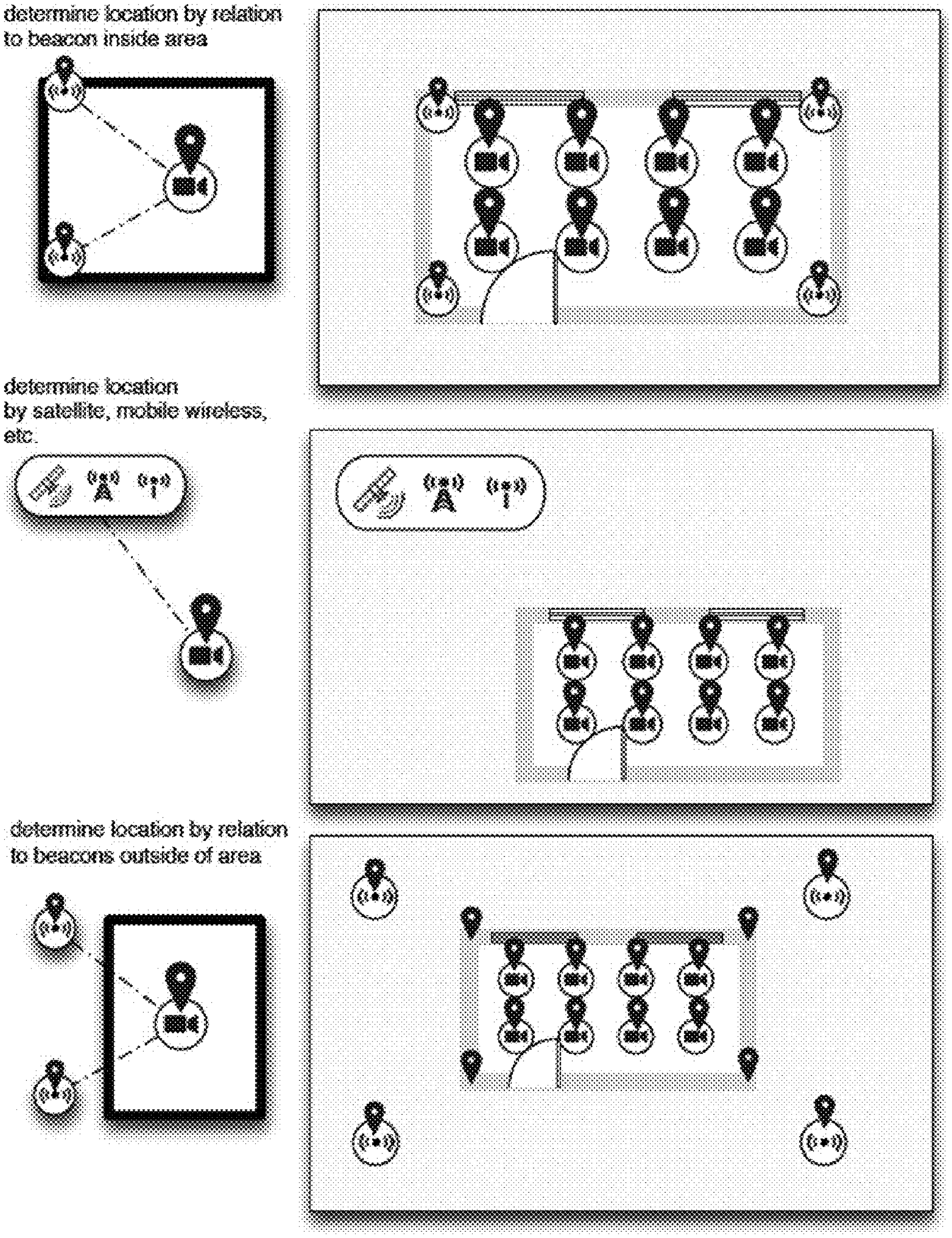
Figure 10:
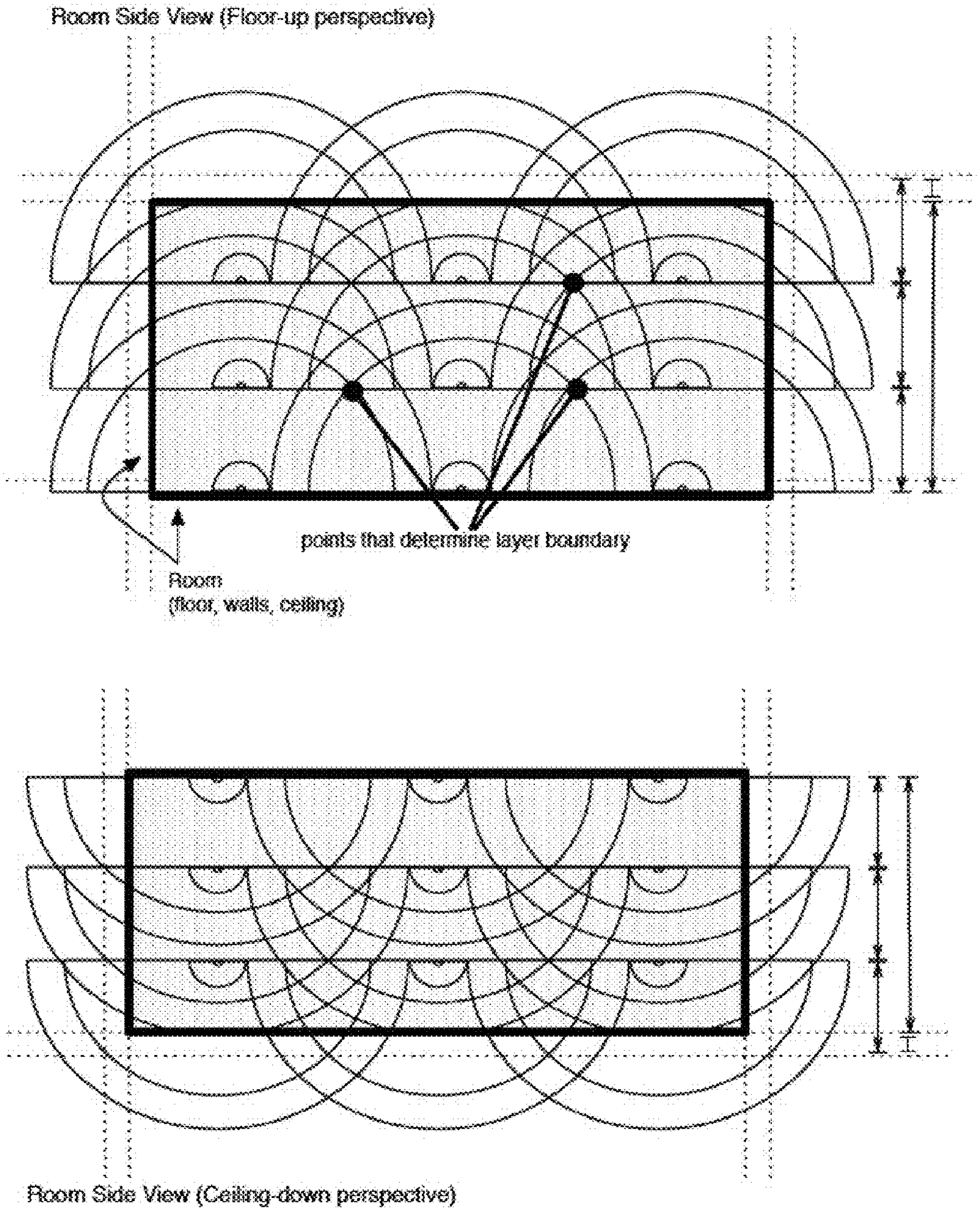
Figure 11:
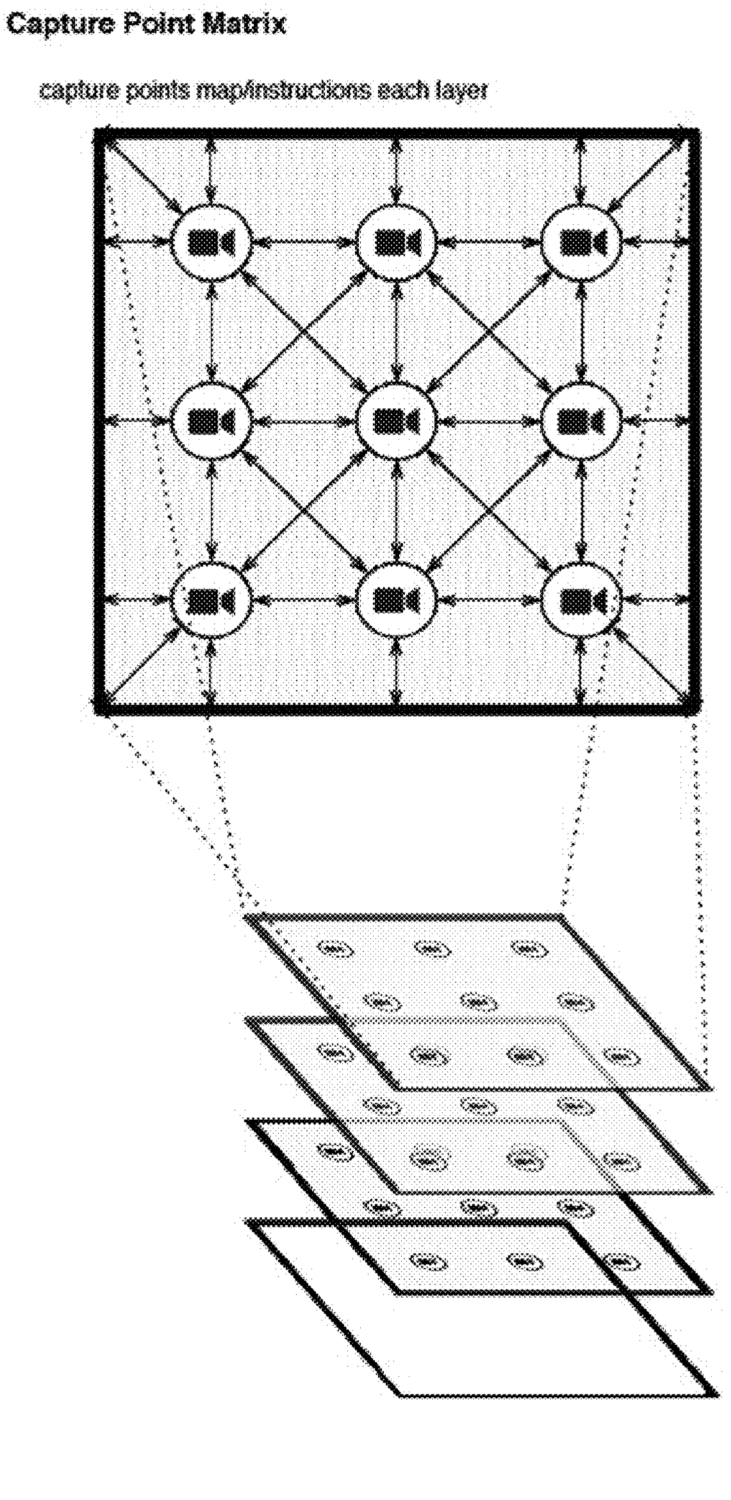
Figure 12:
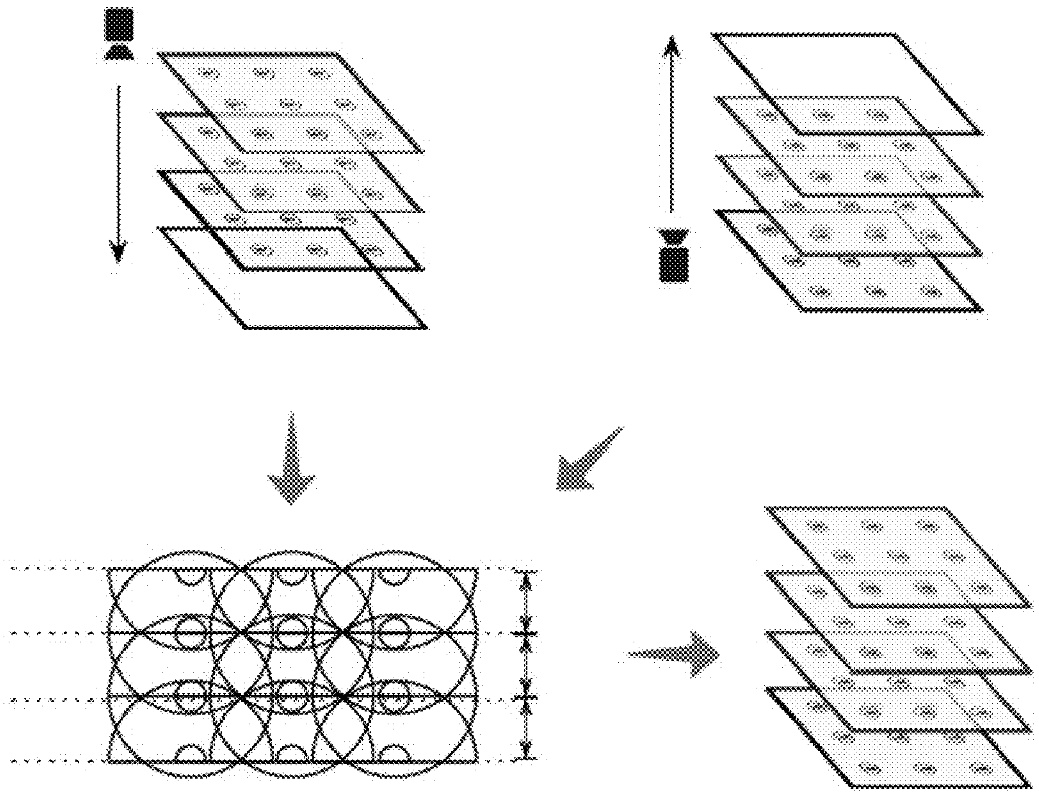
Figure 13:
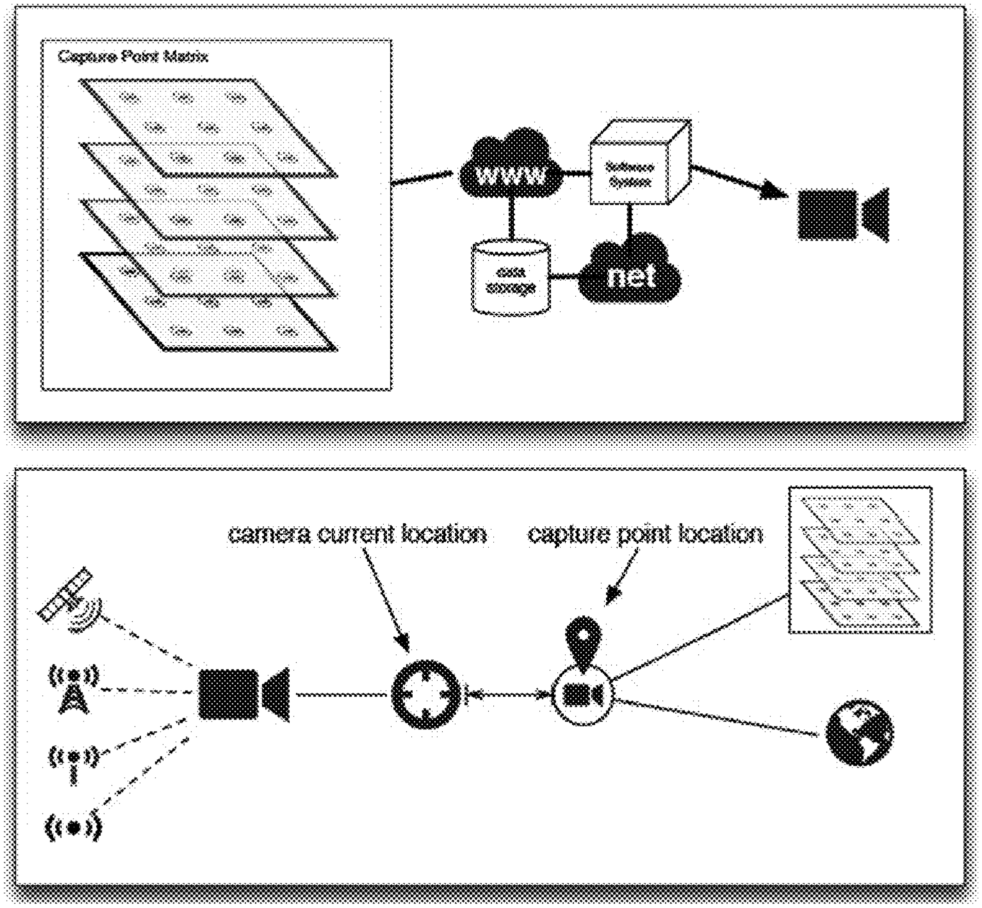
Figure 14:
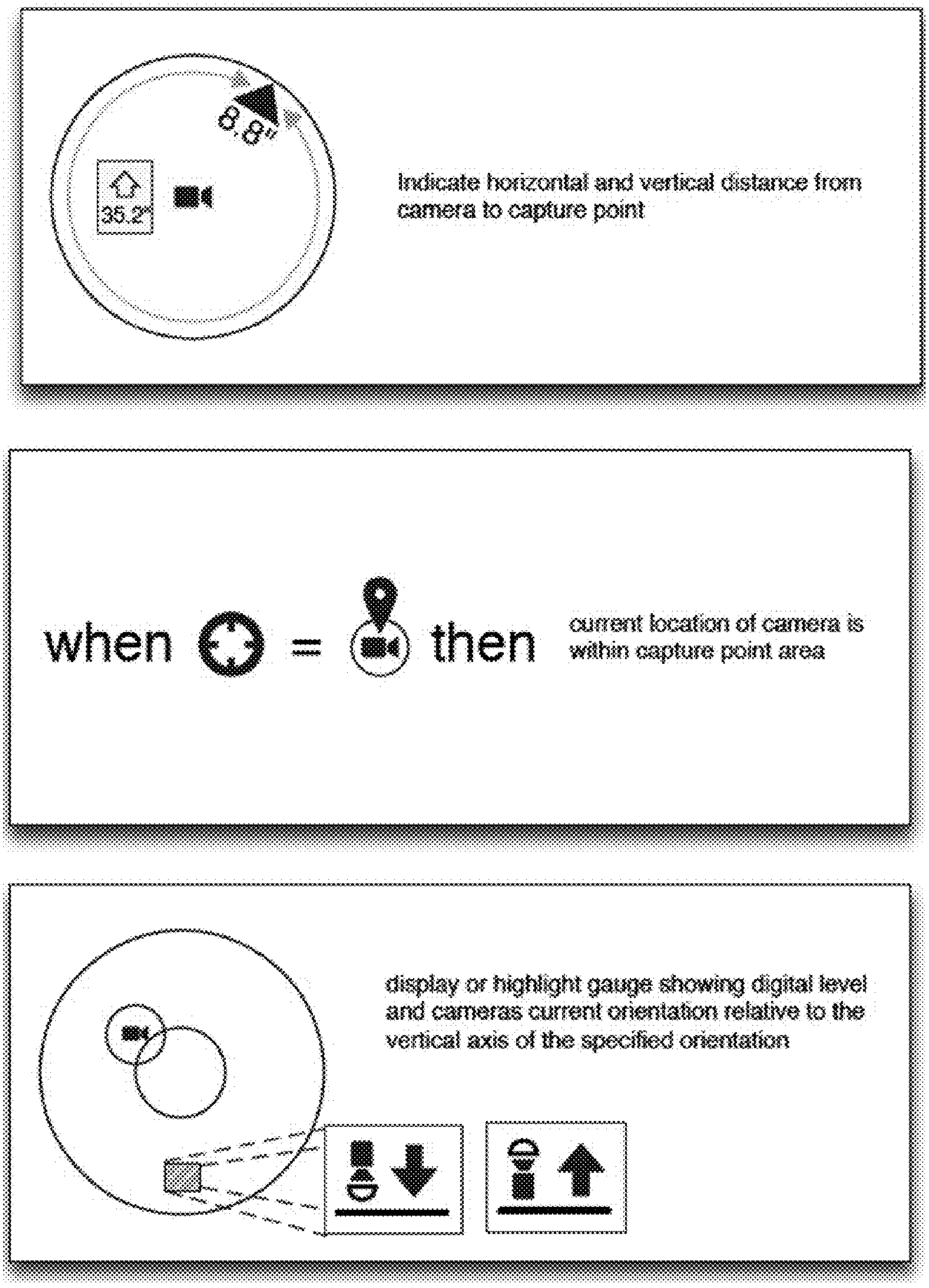
Figure 15:
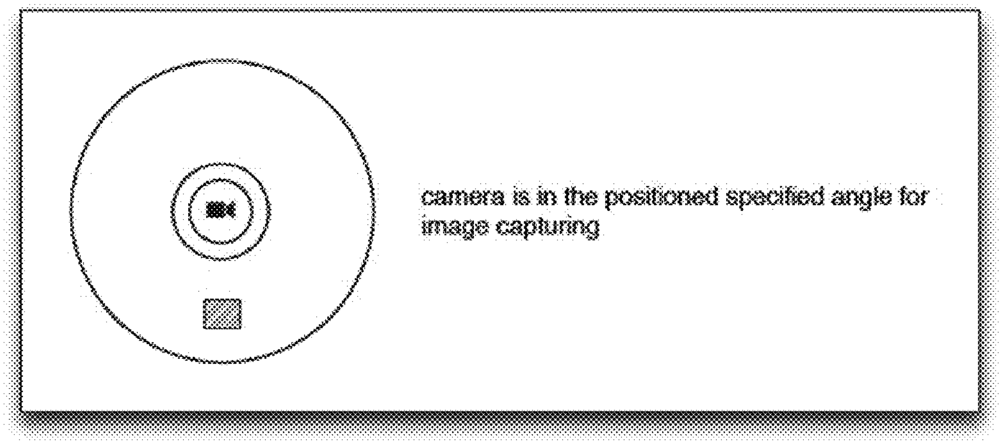
Figure 15:
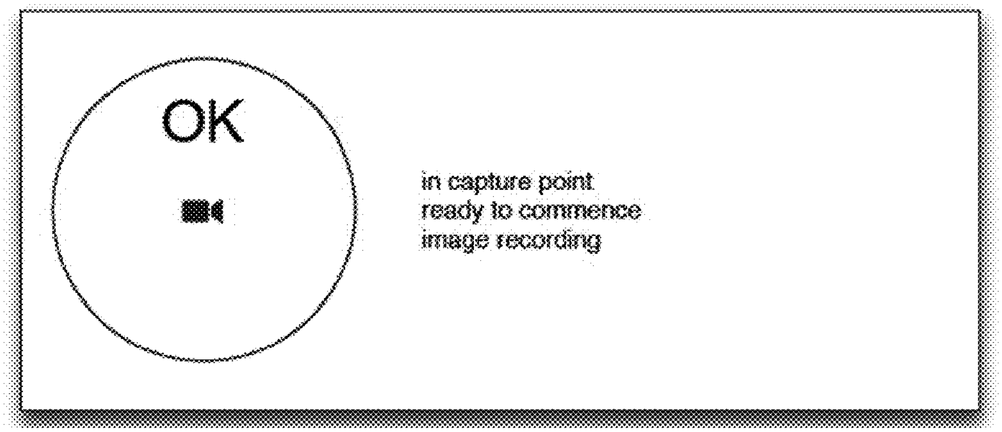
Figure 16:
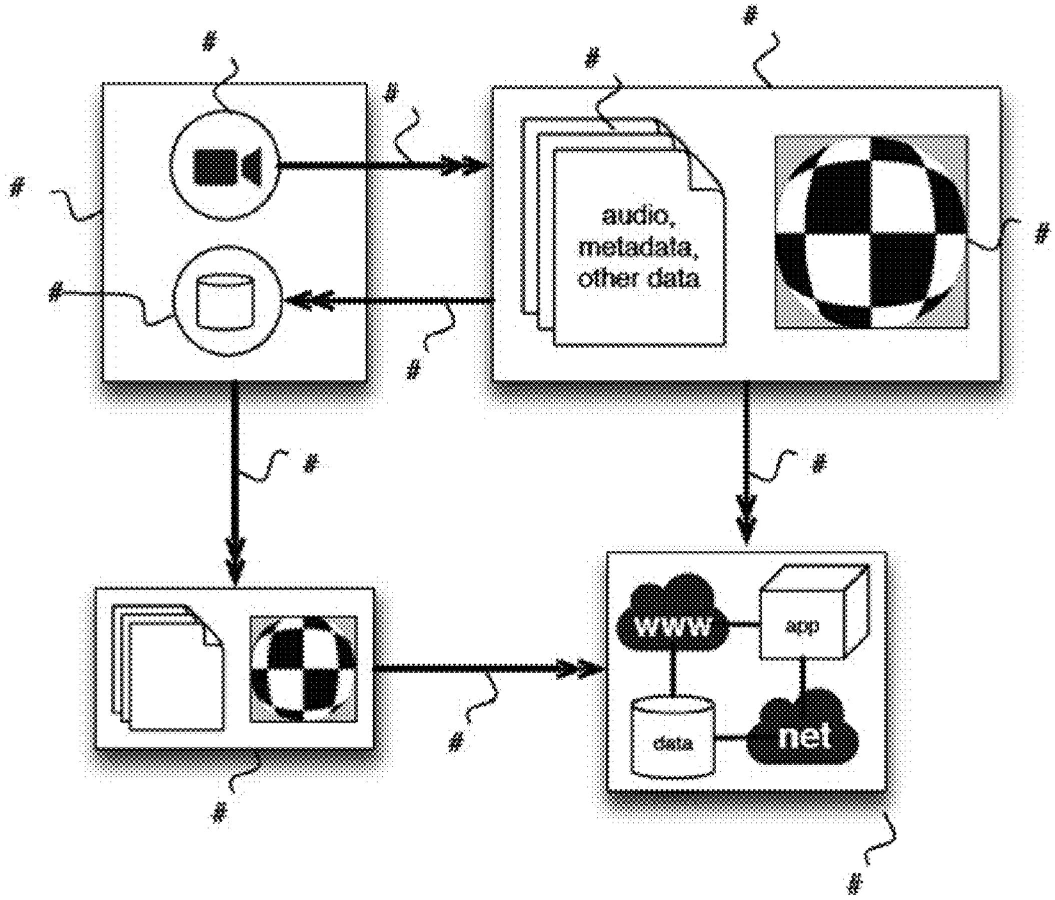
Figure 17:
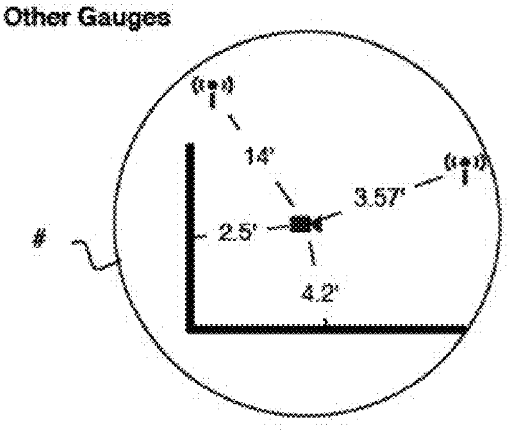
Figure 17:
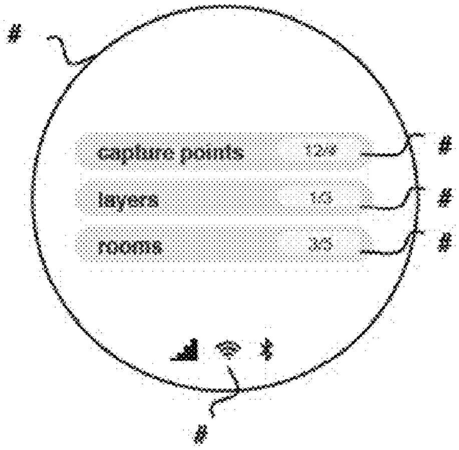
Figure 18:
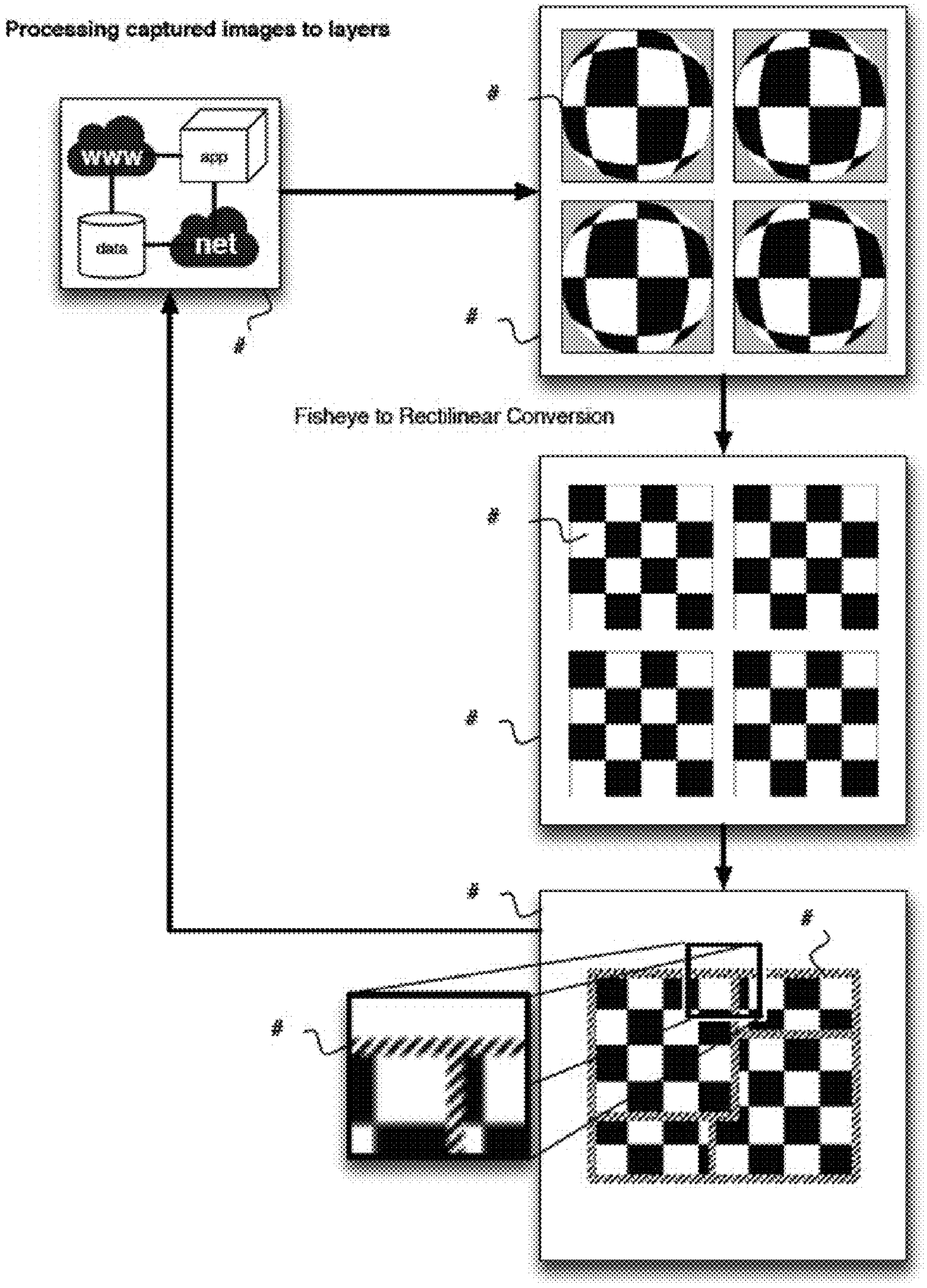
Figure 19:
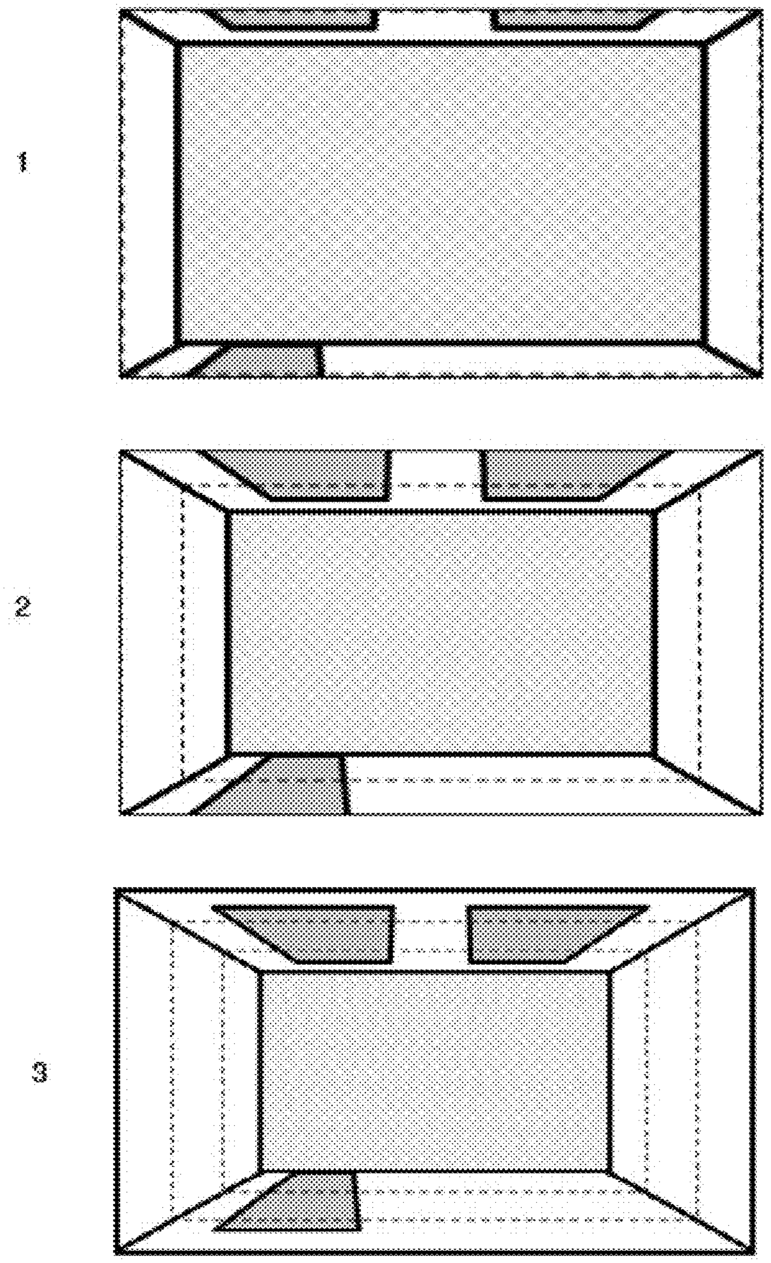
Figure 20:
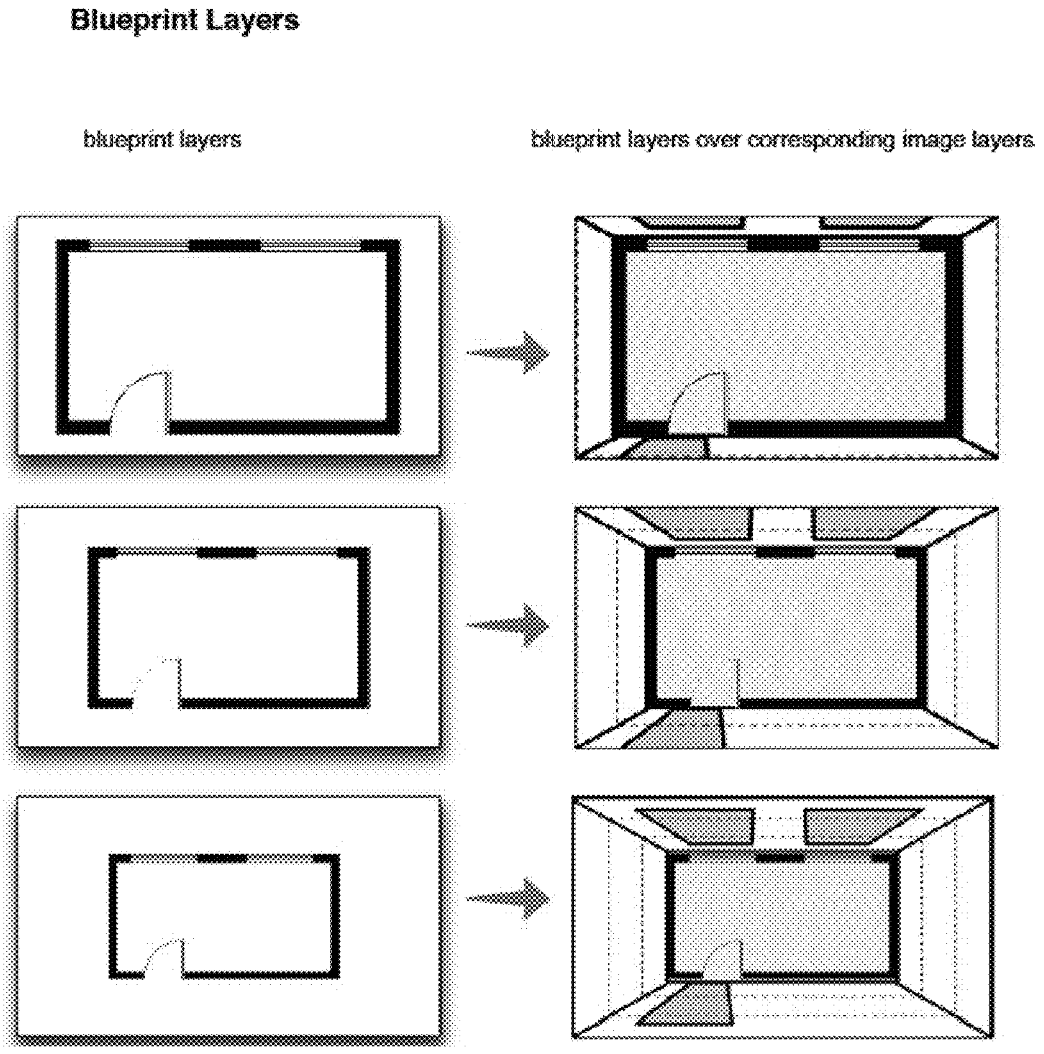
Figure 21:
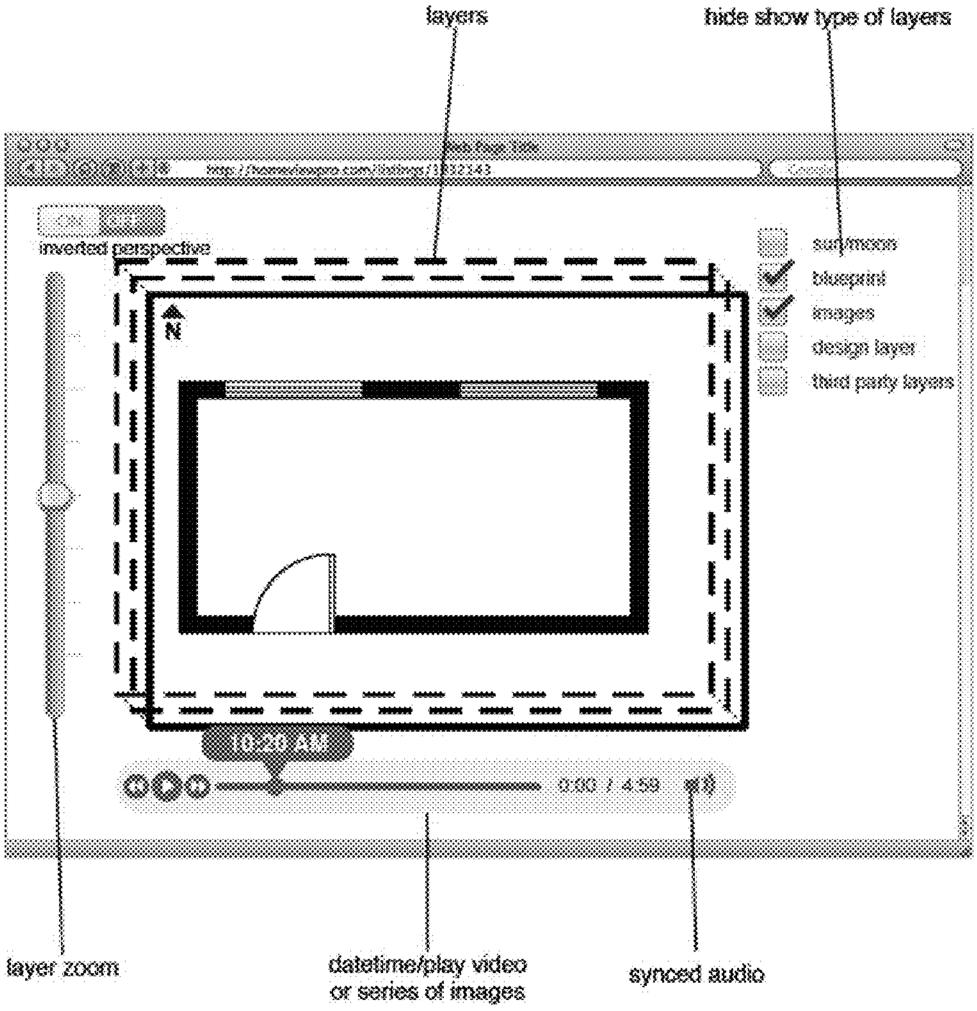
Figure 22:
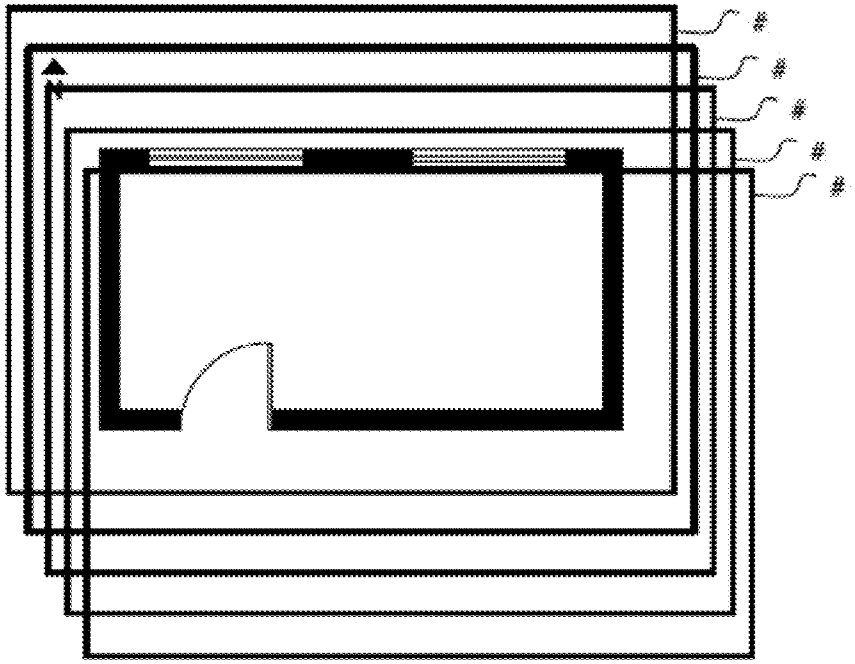
Figure 23:
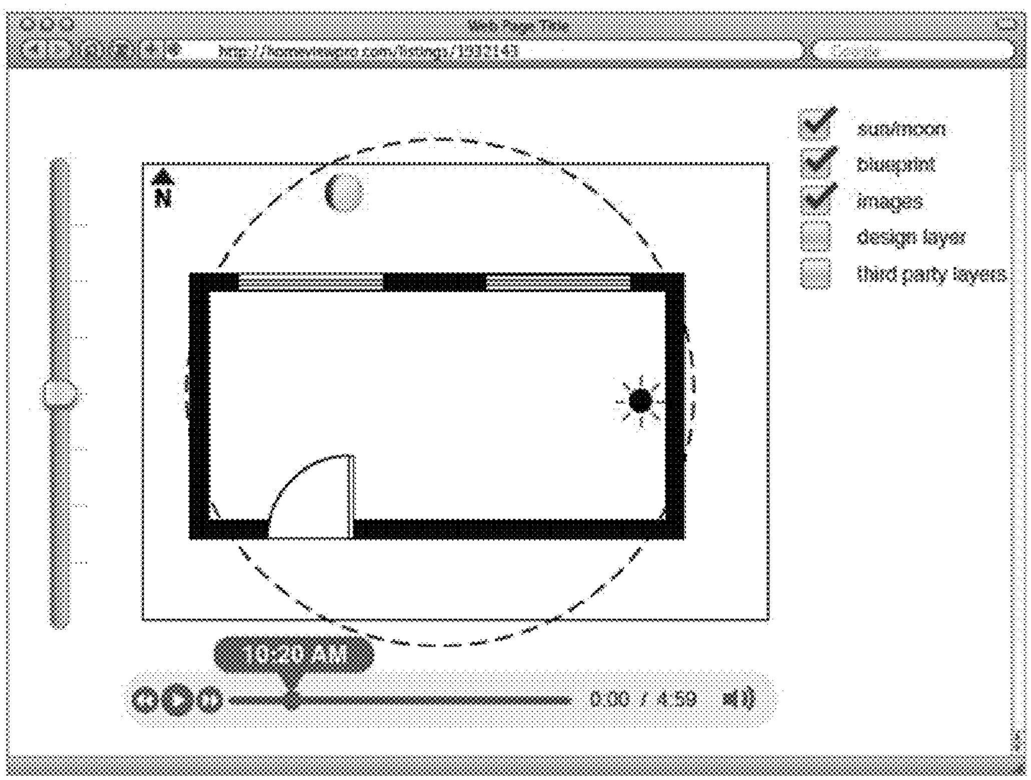
Figure 24:
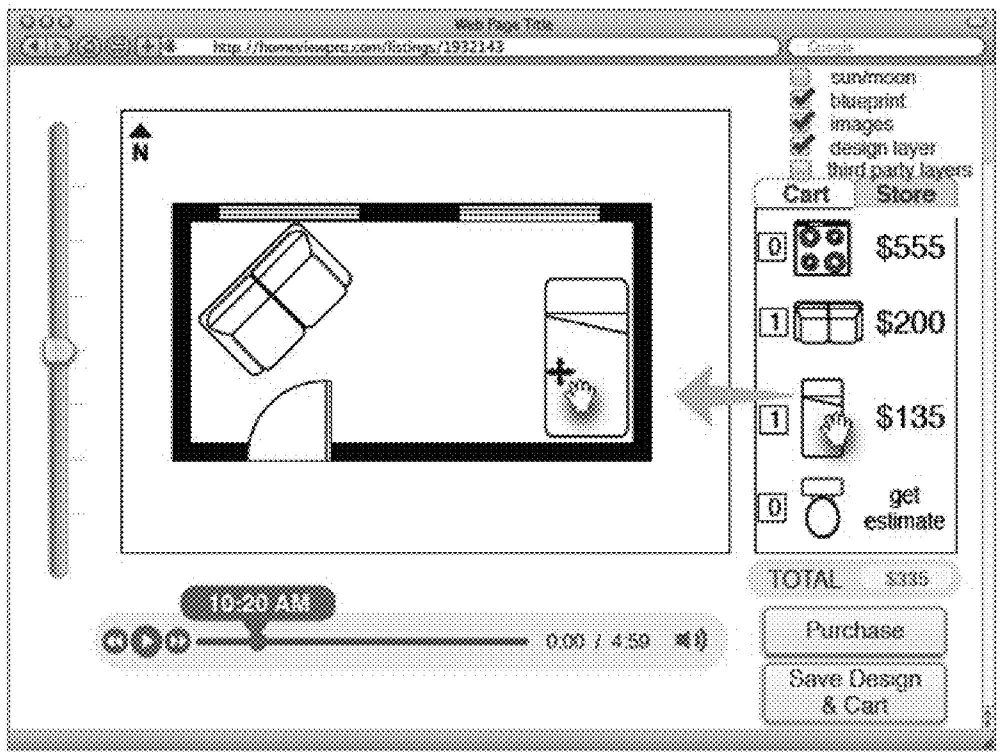
Figure 25:
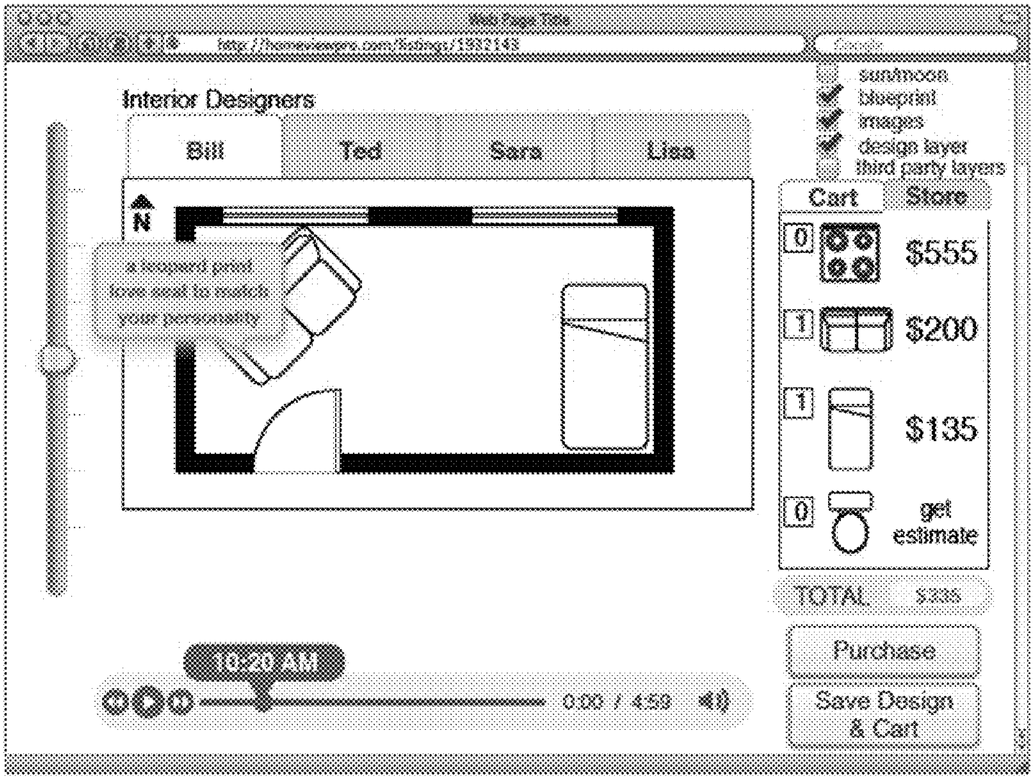
Figure 26:
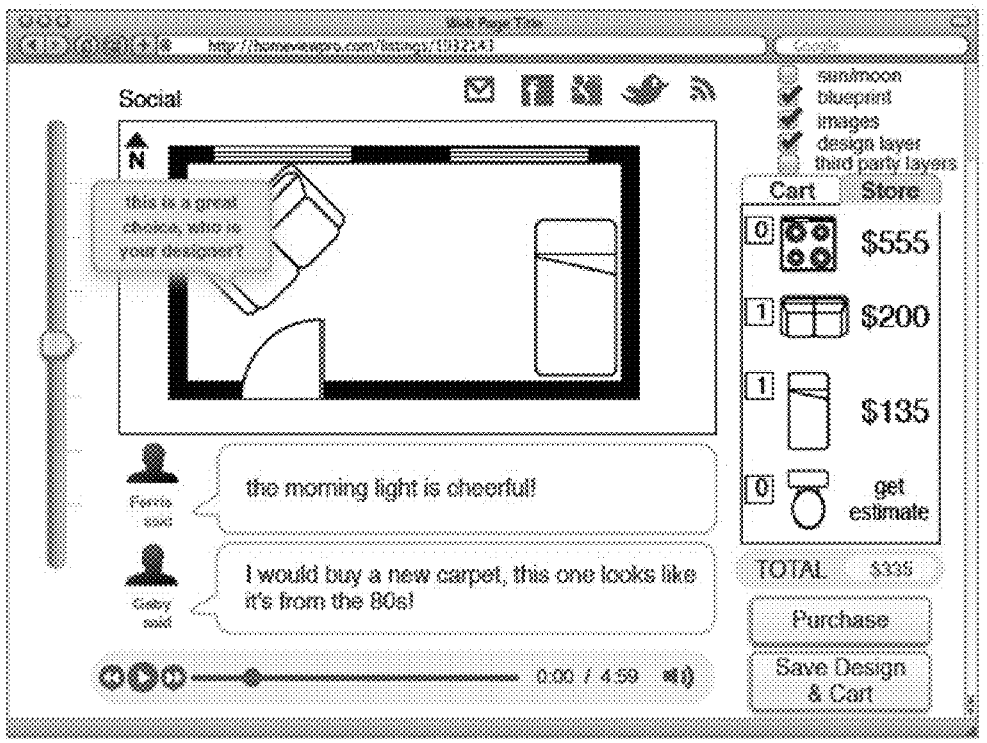
Figure 27:
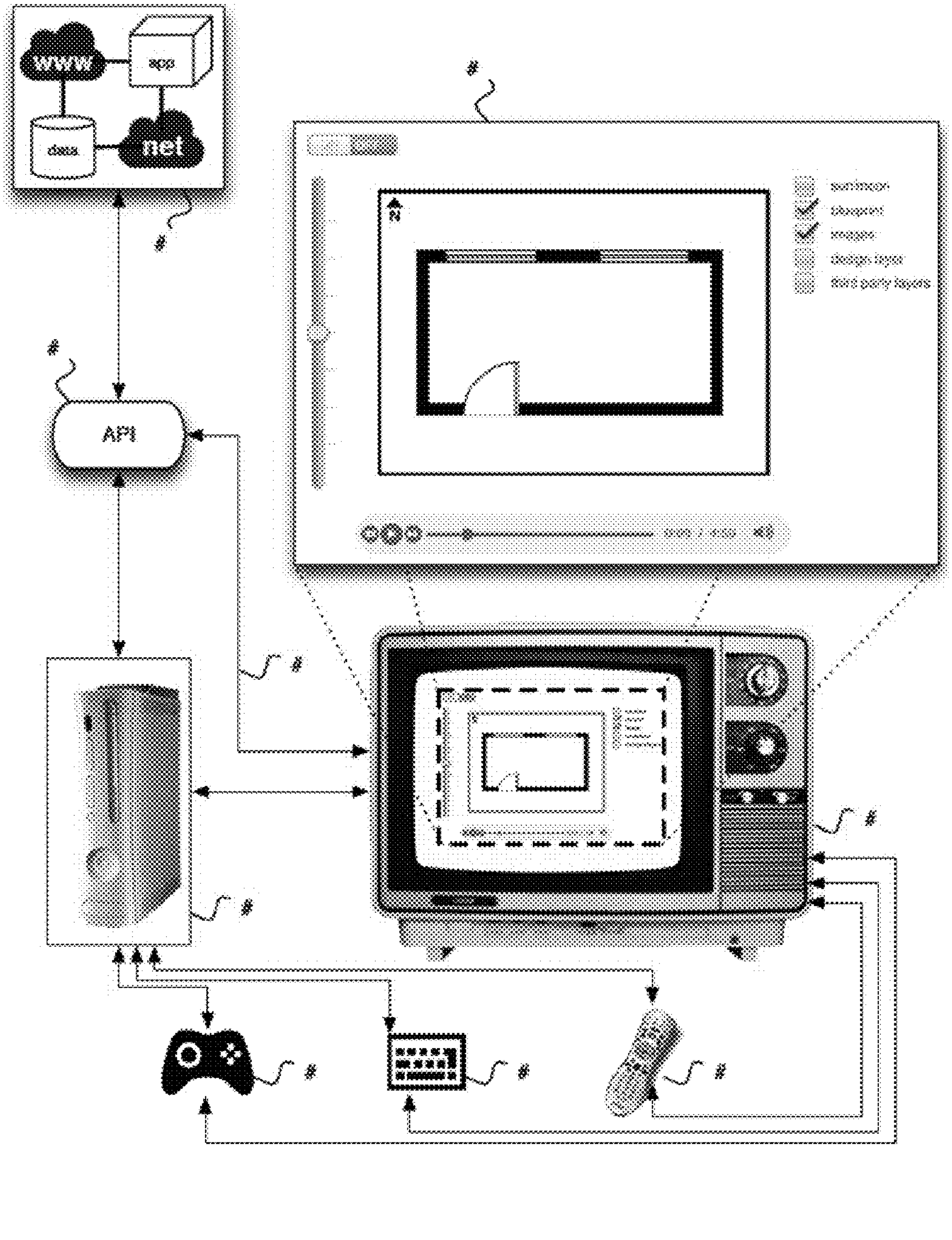
Figure 28:
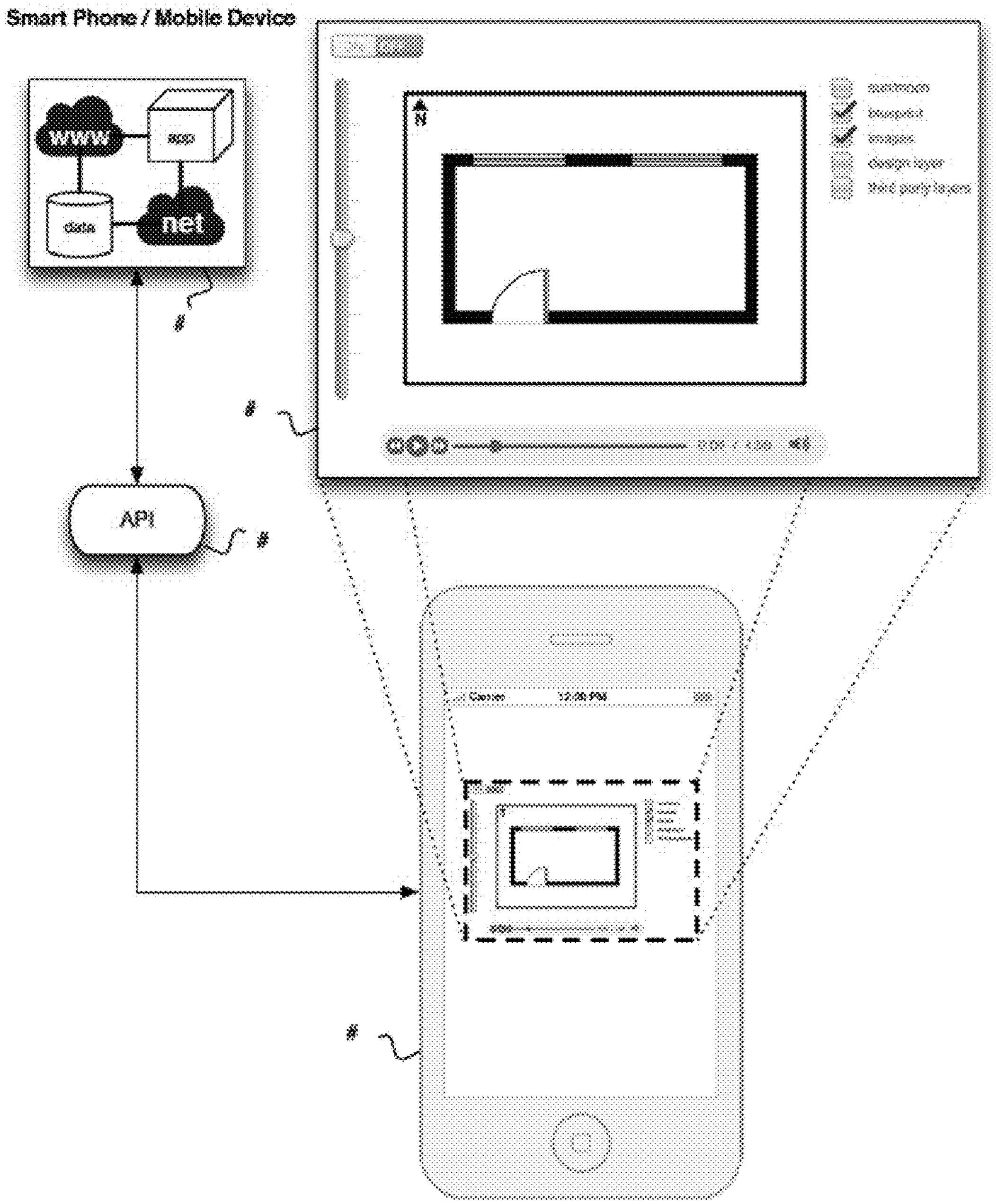
Figure 29:
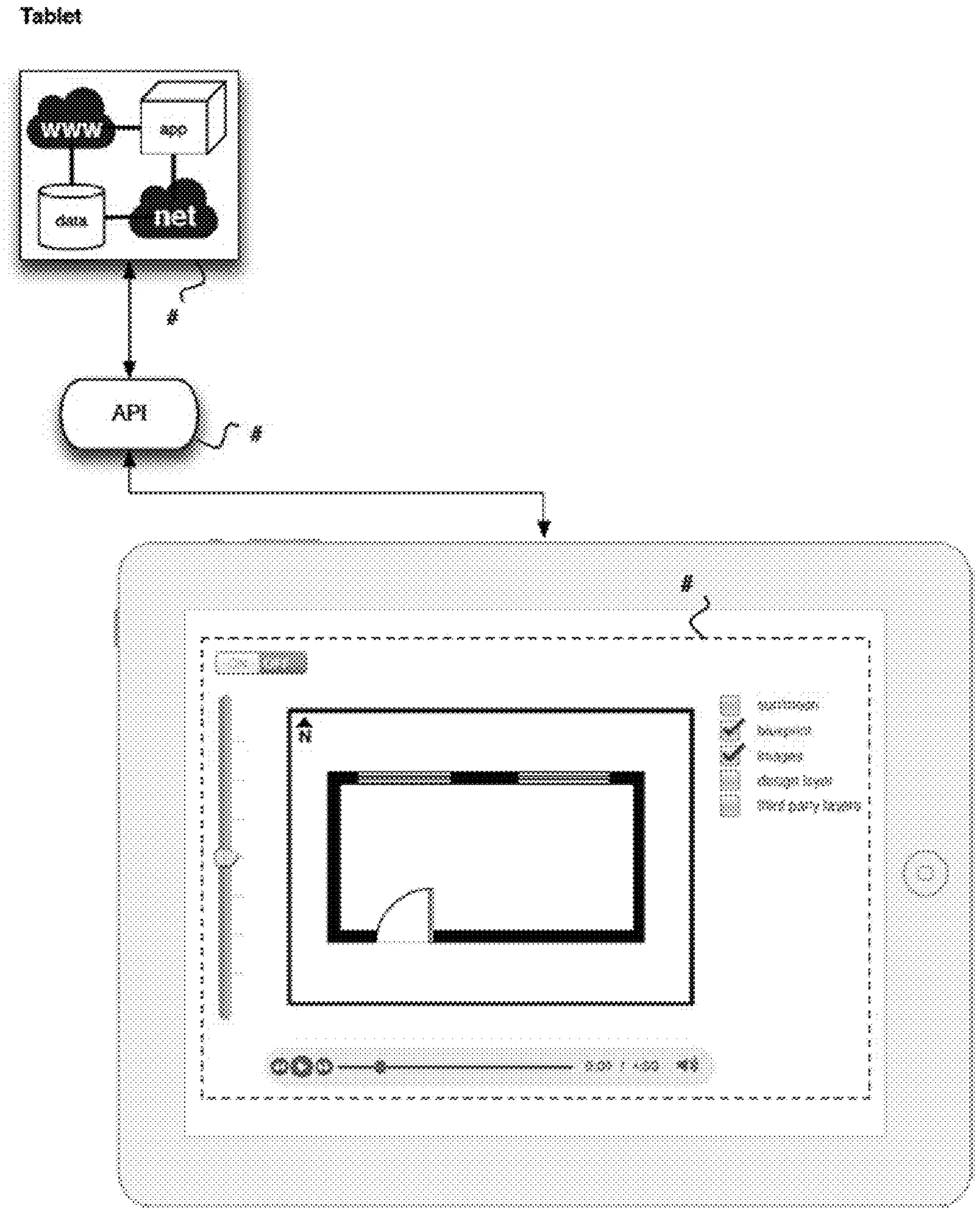

2.4.2.1.2. the remaining lines are darkened and sharpened 2.4.2.2. remote application provides an interface displaying the merged scanned image files and functionality for a user to create vectors by using the mouse and keyboard 2.4.2.3. vector file is saved on remote storage 2.4.2.4. associated with property via unique id in database 2.5. areas record created and stored 2.5.1. an area's space figure is all the space of a plane that is created within two-dimensional vector shape with at least three points on the same x and y axis 2.5.1.1. space figure is stored in a column on the area table for a record 2.5.2. remote application separate areas (such as rooms, garage, patio, backyard, etc.) by using the negative space of the vectors within the boundaries of the property 2.5.2.1. remote application automates this process via computer code 2.5.2.2. remote application makes a interface available and displays the vector blueprint and functionality for a user to create areas by using the mouse and keyboard 2.5.3. each area record is associated with corresponding area records with join table 2.5.3.1. wall areas will be associated corresponding floor areas 2.5.3.2. remote application automates this process via computer code 2.5.3.3. remote application makes a interface available and displays all areas of the property and functionality for a user to create associate areas by using the mouse and keyboard 2.5.4. each area has a opposite plane distance figures 2.5.4.1. there may be more than opposite plane distance figures for vaulted ceilings, etc.

2.5.4.2. remote application automates this process via computer code by using vector areas of corresponding walls 2.5.4.3. remote application makes an interface available and displays corresponding areas of the property and functionality for a user to enter opposite plane distance by using the mouse and keyboard 2.5.4.3.1. this is the distance between floor and ceiling, or wall and wall 2.5.5. each area record's squared space figure is created and stored 2.5.5.1. remote application extrapolates figure from each area vector by computer code process 2.5.5.1.1. for example a 10 foot by 10 foot room would have a space figure of 100 square feet 2.5.6. a record for each area is created stored in remote storage 2.6. capture point layers are created for each area 2.6.1. capture point 2.6.1.1. a capture point is half a sphere area, the radius being the maximum distance which a camera can capture high resolution images either regular or through a panoramic lens (which captures 360 degrees in aperture view)

2.6.1.2. a buffer is created by subtracting a specified amount from the maximum distance 2.6.1.2.1. the buffer distance makes the capture point larger in a radius around center point 2.6.1.2.2. this creates a buffered distance radius 2.6.1.2.3. Remote Application will calculate the resolution capturing ability of the camera to determine the maximum distance for high resolution image media. Therefore, a higher resolution camera will result with a larger diameter sphere.

2.6.2. capture point grid 2.6.2.1. configurations of three or more capture points 2.6.2.2. each capture point arranged so that the buffered distance radius 2.6.3. number of layers is determined by dividing opposite plane distance (the height of a room) by capture point buffered distance 2.6.4. capture points are arranged across each layer by dividing the squared space figure by the capture points buffered radius then arranging them evenly so all vectors in area are covered within capture point buffered distance within capture point grids 2.6.4.1. each capture point layer has the coordinates distance from x,y intersection of all capture points on an x, y axis plane
2.6.4.2. each capture point has distances from walls, ceilings, and other capture points
2.6.4.3. each capture point is assigned a longitude, latitude, and altitude
2.6.5. capture point layer is stored including attribute records on remote storage
2.7. capture point matrix created
2.7.1. capture point layers are stacked in order to capture the entire area, and all objects within, in the buffered maximum radius—high resolution images.
2.7.2. capture point layers can be created in any direction
2.7.2.1. floor-to-ceiling (default)
2.7.2.2. ceiling-to-floor (default)
2.7.2.3. wall-to-wall
2.7.2.4. other
2.7.3. default capture points layers are combined into a capture point matrix for each area
2.7.4. capture point matrix is stored on remote storage
3. property is captured
3.1. camera device
3.1.1. The image capturing device "CAMERA" is comprised of but not limited to local components:
3.1.1.1. High Resolution Digital Video Camera
3.1.1.2. Hemispherical Fisheye Lens with Image Capturing
3.1.1.3. WiFi/Bluetooth/NFC/etc.
3.1.1.4. Mic/Audio Recording Functionality
3.1.1.5. Internal Compass
3.1.1.6. Mobile Network Communication
3.1.1.7. Local Data Storage
3.1.1.8. Local Software System & Computer
3.1.1.9. Altimeter
3.1.1.10. Satcom
3.1.1.11. Light Sensor
3.1.1.12. Gyroscope
3.1.1.13. Power supply
3.1.1.14. Accelerometer
3.1.1.15. Audio Speaker
3.1.1.16. Digital Clock
3.1.2. The CAMERA communicates with REMOTE APPLICATION via/and receives third party data from/via:
3.1.2.1. Satellite Communication
3.1.2.2. Mobile/Cellular Network
3.1.2.3. WiFi/Bluetooth/NFC/RFID, etc.
3.1.2.4. Beacons
3.1.2.5. Communication over wire
3.1.2.6. beacons
3.1.2.6.1. beacons are electronic devices that can communicate their geospatial location and distance to camera wirelessly to the camera
3.2. capture point matrix is read by camera
3.2.1. capture point matrix is read remotely by camera via network by local application
3.2.2. capture point matrix is downloaded to local storage and read by local application
3.3. camera determines its current location
3.3.1. based on relative distances to beacons
3.3.2. based on satellite geospatial location
3.3.3. based on wireless mobile network
3.4. camera determines its current compass direction
3.4.1. this aids in determining capture point matrix (capture points) locations relative to camera 3.5. camera determines its current elevation
3.5.1. based on altimeter
3.5.2. or relative to beacon
3.6. camera determines its current perspective orientation
3.6.1. a single axis runs through the center of camera aperture
3.6.1.1. the axis pointing in two direction
3.6.1.1.1. one pointing directly behind the camera's view
3.6.1.1.2. one pointing directly in front the camera's view
3.7. camera maps capture point matrix relative to current camera location
3.8. camera determines closest capture point from any or all points that:
3.8.1. are:
3.8.1.1. on coordinates matrix
3.8.1.2. in a room
3.8.1.3. in a specified area
3.8.1.4. on a capture points layer
3.8.2. from all points that:
3.8.2.1. have not been captured
3.8.2.2. have to be retaken due to the first capture being rejected for whatever reason (e.g., acceptable quality)
3.9. camera identifies closest capture point
3.9.1. camera issues instructions to be moved to said capture point
3.9.2. gauge shows distance to capture point
3.10. camera is moved to the capture point
3.10.1. when the camera is within the capture point:
3.10.1.1. camera issues instructions to be positioned so lens is pointed in at the specified default angle (straight down or straight up), if no other angle is given
3.10.1.2. gauge shows digital level (actual orientation relative to center, compared with the specified orientation show as center)
3.11. when camera is positioned as specified angle
3.11.1. gauge shows "OK"
3.11.2. camera executes capture by human or by local application
3.11.3. images are captured and stored on local storage
3.11.4. images are uploaded to remote storage by local application
3.11.5. capture point is marked as completed and unreviewed
3.12. all capture points are completed systematically by human or by other apparatus
3.13. Multiple cameras, each on a capture point, can be used simultaneously to record for a length of time
4. Captured images for specific property are processed by remote application into image layers
4.1. image layers are created from the captured images (from the capture point matrix) now in the remote storage by the remote application
4.1.1. captured images are separated by layer
4.1.2. each image is processed with Fisheye to Rectilinear Conversion
4.1.2.1. each image is rendered to show walls and floor, or walls and ceiling from that capture point layer
4.1.2.2. all images from that capture point layer are merged, "stitched together" to form an unbroken combined image layer from its respective perspective (top-down, ceiling-up, etc.)

4.1.2.3. rendering images
4.1.2.3.1. resolution will be reduced, per scale toward center of image to create an appearance of a flattened floor
4.1.2.3.2. for example, the picture is like half of an inflated balloon that is a perfect sphere
4.1.2.3.3. the floor-up and ceiling down pictures each take up opposite hemispheres of the balloon
4.1.2.3.4. when the balloon is fully expanded, the inside representing the picture at a certain resolution, captured at the maximum distance from any determined corners of the cube
4.1.2.3.5. the balloon is deflated to stretch around exactly half of the box
4.1.2.3.6. so the bottom four corners of the box would be touching the balloon at the same time or within the balloon at the same distance away from the balloon (before deflation)
4.1.2.3.7. areas with high resolution are decreased as they are progressively squashed together in image rendering
4.1.2.3.8. end rendering looks like a top down photo of the bottom (or top) half the card board box, where each top edge is the edge of the photo
4.2. a layer is comprised of all the areas (rooms) combined to make a single top-down, or ceiling-up image that spans the entire property
4.3. image layers are stored on remote storage
5. image layers and blueprint vectors made available for user interaction via internet
5.1. remote application renders each layer to display on web in layer view
5.2. layers
5.2.1. blueprint layer
5.2.1.1. vectors
5.2.2. images layer
5.2.2.1. which single image layer displayed in this layer determined by zoom
5.2.3. third party layers
5.2.3.1. satellite maps, road maps, gas station coordinates depicted by icons, traffic, weather, etc.
5.2.4. moon/sun relation layer
5.2.5. interior design/home shopping layer
5.2.6. architectural highlight layer
5.2.7. home repair layer
5.3. layer viewer
5.3.1. makes layer viewer available to users via internet
5.3.2. the layers per specific property are displayed in viewer
5.3.3. viewable portion of layers may be smaller than actual layers size
5.3.4. layers move together
5.3.5. layers are movable with mouse
5.3.6. layers are interactive as if layers were maps in standard map viewer available on internet (such as Google maps)
5.3.6.1. standard
5.3.7. URL, form input (search), or other input specified the layers of a specific property to display
5.4. layer behavior
5.4.1. layers can be hidden and show via checkbox toggle
5.4.2. layers can be zoomed via slide
5.4.3. image layer can be played if video or series of images for that layer exist
5.5. design/shopping layer
5.5.1. shopping cart
5.5.1.1. household items from an external database that have images that have been rendered to exact scale are displayed in a side panel with their respective price, and shipping costs
5.5.1.1.1. third party entities supply products for sale in store by entering product dimensions, shipping costs, etc. in remote storage
5.5.1.1.2. shipping costs calculated based on current property address
5.5.1.1.3. these items will be shipped and installed upon shopping cart check out (purchasing of all items via shopping cart)
5.5.1.1.4. items can be scoped to items that will fit through the door based on door measurements taken from blueprint vectors
5.5.2. each layer can be saved and associated with a user account on the for later retrieval and purchase
5.5.3. interior designers can assemble combination of products on shopping layer, save it on remote storage associated with his/her account and send to client for review or purchase
5.6. architectural highlighting
5.6.1. portions of the blueprint are highlighted to indicate specific portions of architecture or design that a user may find interesting
5.6.2. each layer can be saved and associated with a user account on the for later retrieval
5.7. social interaction
5.7.1. comments are enabled for property or user saved layer
5.7.2. share any property with networked friends
5.7.3. share saved layers
5.7.4. share via third party services
5.8. repair layer
5.8.1. data collected about the condition of home are entered into a repair table in the database on remote storage
5.8.1.1. this data can be collected through home inspection reports or by other means
5.8.2. areas that need repair are highlight in red, or by other
5.8.3. color scale representing severity of repair needed, such as foundation roof etc.
5.8.4. areas of the property are highlighted and the condition/state is shown in a side panel with toggle show/hide on layer for each
5.8.4.1. an actual cost, estimated cost, is displayed with title on the side bar, just like the shopping cart view
5.8.5. total of repairs for selected items in "repair shopping cart" is shown on page
5.8.6. user can purchase repairs in the same manner as shopping cart
5.8.7. each layer can be saved and associated with a user account on the for later retrieval
6. 3D
6.1. all data captured is used to render three dimensional perspectives like Google street view
6.2. 3D architectural blueprint overlaying the 3D perspective image
7. API application programming interface
7.1. API is made available for captured and processed data, media, and rendered media by remote application 7.2. third party applications, such as apps for smart phones, mobile devices, video game consoles, and TVs with application systems, can be made with API.

While illustrative embodiments have been illustrated and described, it will be appreciated that various changes can be made therein without departing from the spirit and scope of the invention.

The invention claimed is:

1. A method comprising:

converting, by a piece of computing hardware, members of a group consisting essentially of architectural blueprints, panoramic photographs, panoramic video, and panoramic audio for a property at an address; and creating, by the piece of computing hardware or another piece of computing hardware, an interactive map of the architectural blueprints superimposed over an image comprised of the panoramic photographs merged together to form a unified perspective.

2. The method of claim 1, wherein creating an interactive map includes creating an interactive top down viewable map.

3. The method of claim 1, further comprising scaling the architectural blueprints and the image to the same scale suitable for making the architectural blueprints match the dimensions of spatial features in the image.

4. The method of claim 1, wherein converting includes taking an architectural blueprint at the address, digitizing the architectural blueprint, and making the digitized architectural blueprint capable of being viewed either over the internet or on a native operating system application.

5. The method of claim 4, wherein converting includes generating a grid template of capture points, the grid being generated by taking a square area of the property and dividing the square area that is derived from one side of a cube that fits inside a sphere without breach that has a radius of a maximum distance of media capture.

6. The method of claim 5, further comprising translating the capture points into human readable instructions with measurements from x, y coordinates of the grid.

7. The method of claim 6, further comprising capturing captures for each capture point which are selected from a group consisting essentially of a ground-up capture, a ceiling-down capture, and in-between captures.

8. The method of claim 1, wherein converting includes converting the panoramic photographs, panoramic video, and panoramic audio to an unbroken patchwork of ceiling-down images at a suitable height from a ground floor, which is capable of being overlaid or underlaid to scale on the architectural blueprint as a photographic layer.

9. The method of claim 8, wherein converting includes converting the architectural blueprint into a blueprint layer.

10. The method of claim 9, providing a play button which upon pressed is capable of playing the panoramic photographs cued up with the panoramic audio.

11. The method of claim 8, wherein converting includes creating a layer with a weather icon to indicate position of the sun or the moon so as to give context to where natural light originated in the panoramic photographs.

12. The method of claim 1, further comprising placing a beacon at each corner of the property.

13. A computer-readable medium, which is non-transitory, having computer-executable instructions stored thereon to implement a method, comprising:

converting members of a group consisting essentially of architectural blueprints, panoramic photographs, panoramic video, and panoramic audio for a property at an address; and creating an interactive map of the architectural blueprints superimposed over an image comprised of the panoramic photographs merged together to form a unified perspective.

14. The computer-readable medium of claim 13, wherein creating an interactive map includes creating an interactive top down viewable map.

15. The computer-readable medium of claim 13, further comprising scaling the architectural blueprints and the image to the same scale suitable for making the architectural blueprints match the dimensions of spatial features in the image.

16. The computer-readable medium of claim 13, wherein converting includes taking an architectural blueprint at the address, digitizing the architectural blueprint, and making the digitized architectural blueprint capable of being viewed either over the internet or on a native operating system application.

17. The computer-readable medium of claim 16, wherein converting includes generating a grid template of capture points, the grid being generated by taking a square area of the property and dividing the square area that is derived from one side of a cube that fits inside a sphere without breach that has a radius of a maximum distance of media capture.

18. The computer-readable medium of claim 17, further comprising translating the capture points into human readable instructions with measurements from x, y coordinates of the grid.

19. The computer-readable medium of claim 18, further comprising capturing captures for each capture point which are selected from a group consisting essentially of a ground-up capture, a ceiling-down capture, and in-between captures.

20. A system comprising:

pieces of computing hardware capable of executing software for:

converting members of a group consisting essentially of architectural blueprints, panoramic photographs, panoramic video, and panoramic audio for a property at an address; and creating an interactive map of the architectural blueprints superimposed over an image comprised of the panoramic photographs merged together to form a unified perspective.

* * * * *